US011994260B2

(12) United States Patent
Feit

(10) Patent No.: US 11,994,260 B2
(45) **Date of Patent: *May 28, 2024**

(54) HARD-PRESSED GLASS LIGHT EMITTING DIODE FLOOD LAMP

(71) Applicant: Feit Electric Company, Inc., Pico Rivera, CA (US)

(72) Inventor: Alan Barry Feit, Encino, CA (US)

(73) Assignee: Feit Electric Company, Inc., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,173

(22) Filed: Jun. 5, 2023

(65) Prior Publication Data

US 2023/0324011 A1 Oct. 12, 2023

Related U.S. Application Data

(63) Continuation of application No. 17/960,466, filed on Oct. 5, 2022, now Pat. No. 11,708,944, which is a (Continued)

(51) Int. Cl.

*F21K 9/23* (2016.01)
*F21K 9/90* (2016.01)
(Continued)

(52) U.S. Cl.

CPC .................. *F21K 9/23* (2016.08); *F21K 9/90* (2013.01); *F21V 5/048* (2013.01); *F21V 7/048* (2013.01);

(Continued)

(58) Field of Classification Search

CPC . F21K 9/23; F21K 9/90; F21V 29/777; F21V 29/83; F21V 7/048; F21V 7/06;

(Continued)

(56) References Cited

U.S. PATENT DOCUMENTS

| | | |
|---|---|---|
| 3,755,665 A | 8/1973 | Grindle |
| 7,682,054 B2 | 3/2010 | Hsu et al. |

(Continued)

FOREIGN PATENT DOCUMENTS

| | | |
|---|---|---|
| EP | 2306083 A1 | 4/2011 |

OTHER PUBLICATIONS

U.S. Appl. No. 14/269,866, filed May 5, 2014, U.S. Pat. No. 9,103,510, Patented.

(Continued)

*Primary Examiner* — Laura K Tso
(74) *Attorney, Agent, or Firm* — Alston & Bird LLP

(57) ABSTRACT

In various embodiments, a light emitting diode (LED) lamp is provided. The LED lamp may include a base; a first housing having a first end and a second end, the first end secured to the base; a second housing having at least in part a partially conical shape, an end of the second housing having a smaller diameter secured to the second end of the first housing; at least one LED secured within the second; driver circuitry secured within the LED flood lamp between the end of the base and the at least one LED; a reflector having a partially conical shape; and a diffuser element secured to at least one of a wider end of the reflector or the end of the second housing having the larger diameter. In some embodiments, the first or second housing may include one or more vents.

20 Claims, 14 Drawing Sheets

Related U.S. Application Data continuation of application No. 17/388,752, filed on Jul. 29, 2021, now Pat. No. 11,493,176, which is a continuation of application No. 16/929,885, filed on Jul. 15, 2020, now Pat. No. 11,105,472, which is a continuation of application No. 16/715,511, filed on Dec. 16, 2019, now Pat. No. 10,746,391, which is a continuation of application No. 16/293,337, filed on Mar. 5, 2019, now Pat. No. 10,539,315, which is a continuation of application No. 15/911,514, filed on Mar. 5, 2018, now Pat. No. 10,260,731, which is a continuation of application No. 14/754,894, filed on Jun. 30, 2015, now Pat. No. 9,909,753, which is a continuation of application No. 14/269,866, filed on May 5, 2014, now Pat. No. 9,103,510.

(60) Provisional application No. 61/863,063, filed on Aug. 7, 2013, provisional application No. 61/826,609, filed on May 23, 2013.

(51) Int. Cl.

| | |
|---|---|
| ***F21V 5/04*** | (2006.01) |
| ***F21V 7/04*** | (2006.01) |
| ***F21V 7/06*** | (2006.01) |
| ***F21V 13/04*** | (2006.01) |
| ***F21V 19/00*** | (2006.01) |
| ***F21V 23/00*** | (2015.01) |
| ***F21V 23/06*** | (2006.01) |
| ***F21V 29/77*** | (2015.01) |
| ***F21V 29/83*** | (2015.01) |

(52) U.S. Cl.

CPC ................ *F21V 7/06* (2013.01); *F21V 13/04* (2013.01); *F21V 19/0065* (2013.01); *F21V 23/009* (2013.01); *F21V 23/06* (2013.01); *F21V 29/777* (2015.01); *F21V 29/83* (2015.01)

(58) Field of Classification Search

CPC ...... F21V 19/065; F21V 23/009; F21V 23/06; F21V 29/77

USPC .......................................................... 362/294

See application file for complete search history.

(56) References Cited

U.S. PATENT DOCUMENTS

| | | | |
|---|---|---|---|
| 8,384,275 B2 | 2/2013 | Tanaka et al. | |
| 9,103,510 B2 * | 8/2015 | Feit | F21K 9/90 |
| 9,228,734 B2 * | 1/2016 | Chen | F21K 9/23 |
| 9,909,753 B2 * | 3/2018 | Feit | F21V 23/06 |
| 10,260,731 B2 * | 4/2019 | Feit | F21K 9/90 |
| 10,317,065 B2 * | 6/2019 | Holmes | F21V 29/51 |
| 10,359,185 B2 | 7/2019 | Tang et al. | |
| 10,539,315 B2 * | 1/2020 | Feit | F21V 5/048 |
| 10,746,391 B2 * | 8/2020 | Feit | F21V 29/777 |
| 11,105,472 B2 * | 8/2021 | Feit | F21V 23/009 |
| 11,493,176 B2 * | 11/2022 | Feit | F21V 29/83 |
| 11,708,944 B2 * | 7/2023 | Feit | F21V 29/777 362/249.02 |
| 2005/0011123 A1 | 1/2005 | Dai | |
| 2005/0111234 A1 | 5/2005 | Martin et al. | |
| 2006/0043546 A1 | 3/2006 | Kraus | |
| 2007/0011565 A1 | 1/2007 | Kim et al. | |
| 2007/0115654 A1 | 5/2007 | Ruben | |
| 2010/0207534 A1 | 8/2010 | Dowling et al. | |
| 2010/0225220 A1 | 9/2010 | Tanaka et al. | |
| 2010/0277067 A1 * | 11/2010 | Maxik | F21V 3/00 315/32 |
| 2011/0007542 A1 | 1/2011 | Lin et al. | |
| 2011/0037368 A1 | 2/2011 | Huang | |
| 2011/0075422 A1 | 3/2011 | Van et al. | |
| 2011/0080732 A1 | 4/2011 | Chen | |
| 2011/0170287 A1 | 7/2011 | Medinis | |
| 2011/0291542 A1 * | 12/2011 | Lu | F21V 29/83 313/46 |
| 2012/0314426 A1 * | 12/2012 | Chen | F21V 29/83 362/373 |
| 2012/0327664 A1 | 12/2012 | Pickard et al. | |
| 2013/0011426 A1 | 1/2013 | Tuereci et al. | |
| 2013/0114261 A1 | 5/2013 | Scianna et al. | |
| 2013/0271998 A1 | 10/2013 | Merschon et al. | |
| 2013/0294094 A1 | 11/2013 | Horng | |
| 2015/0314028 A1 | 11/2015 | Hsiao | |
| 2016/0186981 A1 * | 6/2016 | Chen | F21V 23/006 362/373 |
| 2016/0265727 A1 * | 9/2016 | Akiyama | F21V 29/83 |
| 2020/0318823 A1 | 10/2020 | Bocock et al. | |

OTHER PUBLICATIONS

U.S. Appl. No. 14/754,894, filed Jun. 30, 2015, U.S. Pat. No. 9,909,753, Patented.

U.S. Appl. No. 15/911,514, filed Mar. 5, 2018, U.S. Pat. No. 10,260,731, Patented.

U.S. Appl. No. 16/293,337, filed Mar. 5, 2019, U.S. Pat. No. 10,539,315, Issued.

U.S. Appl. No. 16/715,511, filed Dec. 16, 2019, U.S. Pat. No. 10,746,391, Patented.

U.S. Appl. No. 16/929,885, filed Jul. 15, 2020, U.S. Pat. No. 11,105,472, Patented.

U.S. Appl. No. 17/388,754, filed Jul. 29, 2021, U.S. Pat. No. 11,493,176, Patented.

United States Patent and Trademark Office, Final Office Action for U.S. Appl. No. 16/929,885, filed Apr. 16, 2021, 12 pages, USA.

United States Patent and Trademark Office, Non-Final Office Action for U.S. Appl. No. 16/929,885, filed Apr. 7, 2021, 18 pages, USA.

United States Patent and Trademark Office, Notice of Allowance for U.S. Appl. No. 14/269,866, dated Jun. 10, 2015, 6 pages, U.S.A.

United States Patent and Trademark Office, Notice of Allowance for U.S. Appl. No. 14/754,894, dated Oct. 26, 2017, U. S .A.

United States Patent and Trademark Office, Notice of Allowance for U.S. Appl. No. 16/293,337, filed Oct. 1, 2019, 7 pages, USA.

United States Patent and Trademark Office, Office Action for U.S. Appl. No. 14/269,866, dated Apr. 2, 2015, 12 pages, U.S.A.

United States Patent and Trademark Office, Office Action for U.S. Appl. No. 14/754,894, dated Apr. 11, 2017, 22 pages, U.S.A.

United States Patent and Trademark Office, Office Action for U.S. Appl. No. 14/754,894, dated Sep. 7, 2017, 7 pages, U.S.A.

U.S. Appl. No. 17/960,466, filed Oct. 5, 2022, U.S. Pat. No. 11,708,944, Issued.

U.S. Appl. No. 17/388,752, filed Jul. 29, 2021, U.S. Pat. No. 11,493,176, Issued.

U.S. Appl. No. 16/929,885, filed Jul. 15, 2020, U.S. Pat. No. 11,105,472, Issued.

U.S. Appl. No. 16/715,511, filed Dec. 16, 2019, U.S. Pat. No. 10,746,391, Issued.

U.S. Appl. No. 15/911,514, filed Mar. 5, 2018, U.S. Pat. No. 10,260,731, Issued.

U.S. Appl. No. 14/754,894, filed Jun. 30, 2015, U.S. Pat. No. 9,909,753, Issued.

U.S. Appl. No. 14/269,866, filed May 5, 2014, U.S. Pat. No. 9,103,510, Issued.

* cited by examiner

FIG. 12A
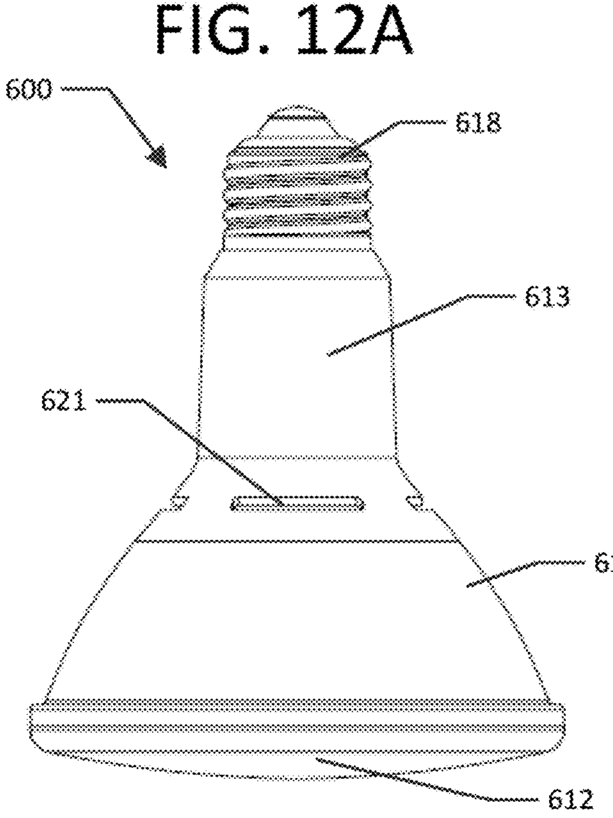
FIG. 12B
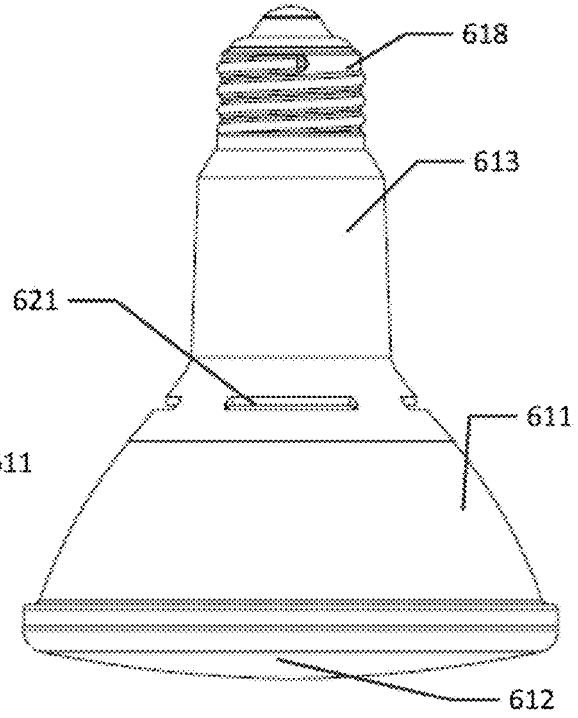
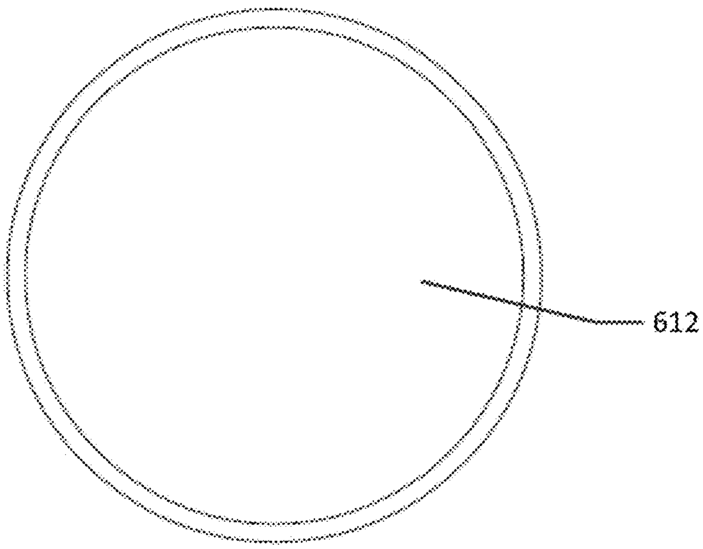
FIG. 12C

HARD-PRESSED GLASS LIGHT EMITTING DIODE FLOOD LAMP

CROSS-REFERENCE TO RELATED APPLICATIONS

This application is a continuation of U.S. application Ser. No. 17/960,466, FILED Oct. 5, 2022, which application is a continuation of U.S. application Ser. No. 17/388,752, filed Jul. 29, 2021 (now U.S. Pat. No. 11,493,176), which application is a continuation of U.S. application Ser. No. 16/929,885, filed Jul. 15, 2020 (now U.S. Pat. No. 11,105,472); which application is a continuation of U.S. application Ser. No. 16/715,511, filed Dec. 16, 2019 (now U.S. Pat. No. 10,746,391); which application is a continuation of U.S. application Ser. No. 16/293,337, filed Mar. 5, 2019 (now U.S. Pat. No. 10,539,315); which application is a continuation of U.S. application Ser. No. 15/911,514, filed Mar. 5, 2018 (now U.S. Pat. No. 10,260,731); which application is a continuation of U.S. application Ser. No. 14/754,894, filed Jun. 30, 2015 (now U.S. Pat. No. 9,909,753); which application is a continuation of U.S. application Ser. No. 14/269,866, filed May 5, 2014 (now U.S. Pat. No. 9,103,510); which application further claims priority to and the benefit of U.S. Provisional Application Ser. No. 61/826,609, filed May 23, 2013, and U.S. Provisional Application Ser. No. 61/863,063 filed Aug. 7, 2013; the contents of all of which as are incorporated by reference herein in their entireties.

BACKGROUND

Conventional parabolic aluminized reflector (PAR) and multi-faceted reflector (MR) halogen lamps, also known as flood lamps, are used in a variety of contexts because of their white light (generally 2800-3200 K) and narrow beam spread (generally 8-60 degrees). However, halogen lamps operate at high temperatures and are capable of reaching temperatures of 260° C. (500° F.) or more during operation. Thus, halogen lamps can be dangerous. The high heat output of halogen lamps means they are also inefficient, as a significant fraction of energy is converted to infrared radiation instead of visible radiation. In order to help protect against lamp breakage due to the high operating temperature of PAR and MR halogen lamps or due to possible contact of the lamp with moisture, a main portion of most PAR and MR halogen lamps is made of hard-pressed glass.

Attempts have been made to use compact fluorescent lamps or light emitting diode (LED) lamps to provide a safer and/or more efficient alternative to PAR and MR halogen lamps. However, while successful in certain aspects, such attempts have generally failed to adequately replicate the narrow beam spread, high lumen output, and other optical qualities of PAR and MR halogen lamps.

Thus, a need exists in the art for a safe and efficient replacement for PAR and MR halogen lamps while meeting both of the desired criteria described above and still other criteria. A further need also exists for an efficient lamp that is an aesthetic match in shape, size, and appearance to the traditional halogen PAR or MR lamp.

BRIEF SUMMARY

The following and other advantages are provided by the light emitting diode (LED) flood lamp described herein. The LED flood lamp provides a lamp with the look and lighting characteristics of a traditional parabolic aluminized reflector (PAR) or multifaceted reflector (MR) halogen lamp, but which operates more efficiently and at lower temperatures. Thus, amongst various features, the LED flood lamp disclosed herein provides a flood lamp with the design appearance of a PAR or MR halogen lamp. Additionally, the LED flood lamp disclosed herein seeks to substantially replicate the narrow beam spread and high lumen output of PAR and MR halogen lamps via a reflector configured to direct the light of the LEDs present in the LED flood lamp, a lens configured to act as an optics controller, and thus control beam spread, and/or the LED configuration within the LED flood lamp. The reflector and lens may be integrated as part of the LED flood lamp or may be a separate assembly which may, in certain embodiments, include an LED mounting surface and other components required for an operational working lamp, as will be described in further detail below. In various embodiments, the LED flood lamp may include vents to allow fluid (e.g., air, water, or the like) to pass through a portion of the LED flood lamp and assist with heat dissipation.

In various embodiments, a light emitting diode (LED) flood lamp is provided. The LED flood lamp may include a base cap configured to be secured within a lighting fixture socket and make an electrical connection with at least one electrical component of the lighting fixture socket; a first housing having a first end and a second end, the first end secured to the base cap; a second housing having at least in part a partially conical shape, an end of the second housing having a smaller diameter secured to the second end of the first housing; at least one LED secured within the second housing and positioned such that light emitted by the LED is directed generally toward an end of the second housing having a larger diameter; driver circuitry secured within the LED flood lamp between the end of the base cap and the at least one LED, the driver circuitry configured to supply electricity from the base cap to the at least one LED; a reflector having a partially conical shape and configured to be secured at least partially within the second housing; and a diffuser element configured to diffuse the light emitted by the at least one LED and secured to at least one of a wider end of the reflector or the end of the second housing having the larger diameter.

In various embodiments, an LED flood lamp having vents is provided. The LED flood lamp may include a first housing comprising a seat having at least one vent disposed therein; a second housing having a narrow end and a wide end, the narrow end secured to the first housing such that the narrow end is in contact with at least a portion of the seat, the second housing having an outer surface and an inner surface extending between the narrow end and the wide end, the inner and outer surfaces connected at the wide end and open at the narrow end, the inner surface including one or more fins; wherein fluid may flow through the at least one vent and into the space between the outer surface and the inner surface.

BRIEF DESCRIPTION OF THE SEVERAL VIEWS OF THE DRAWING(S)

Brief reference will now be made to the accompanying drawings, which are not necessarily drawn to scale, and wherein.

Figure 3A:
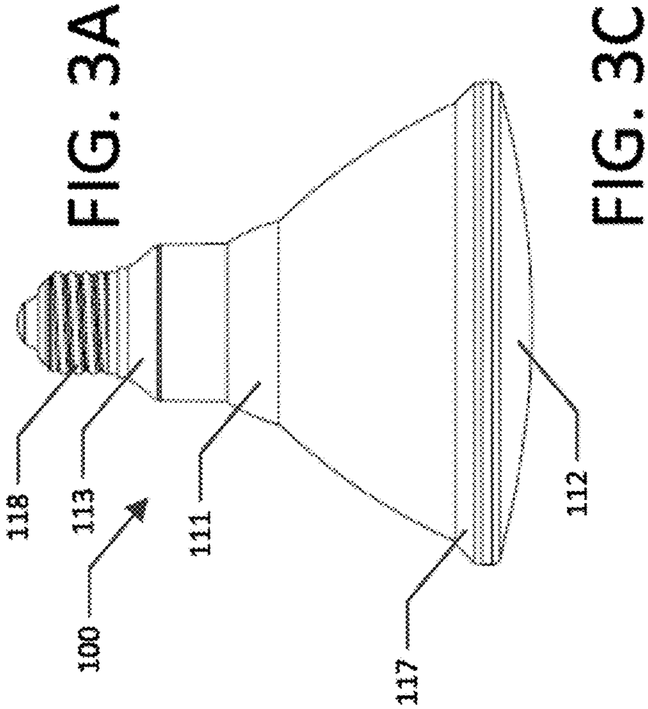
Figure 3B:
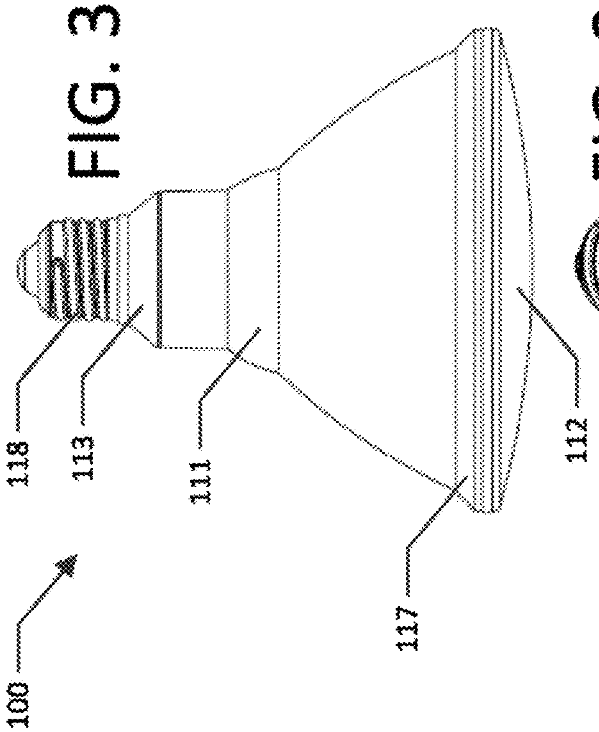
Figure 3C:
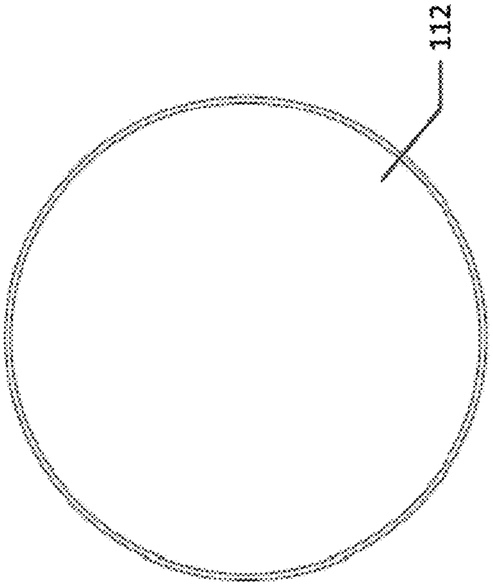
Figure 3D:
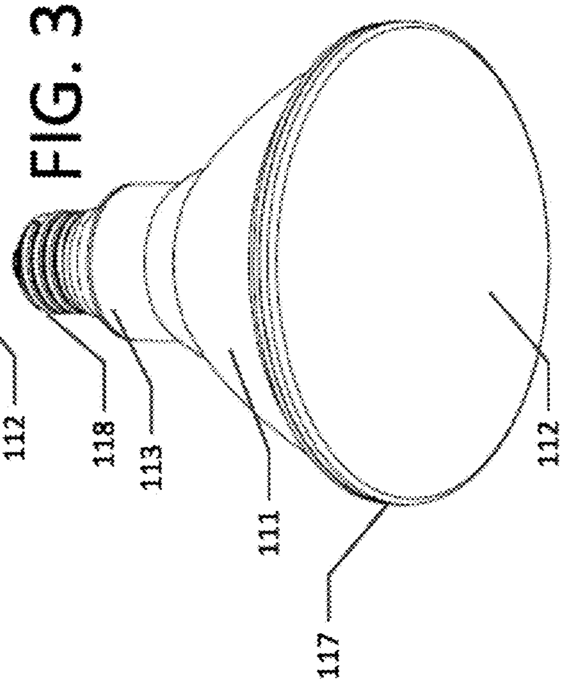
Figure 4:
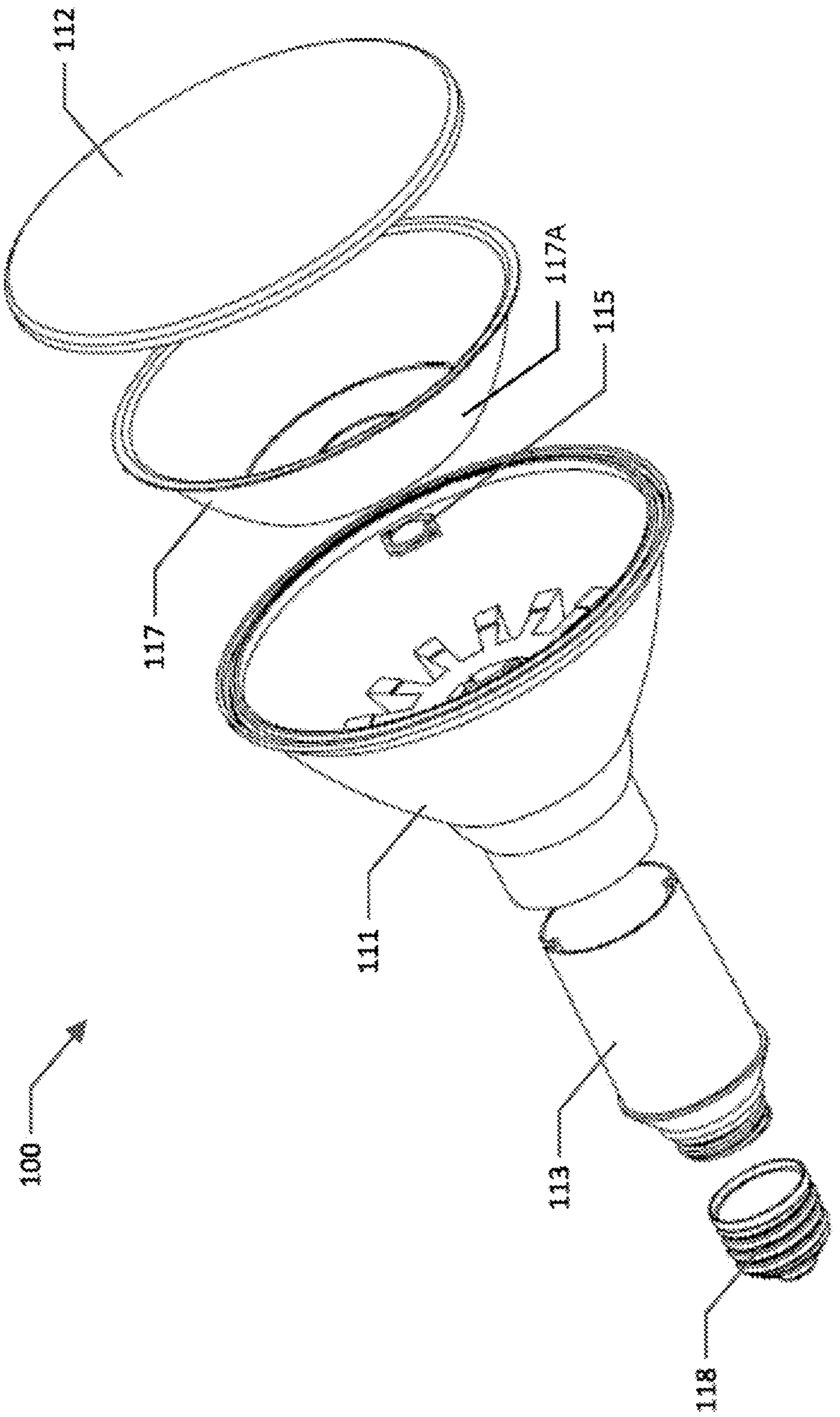
Figure 5B:
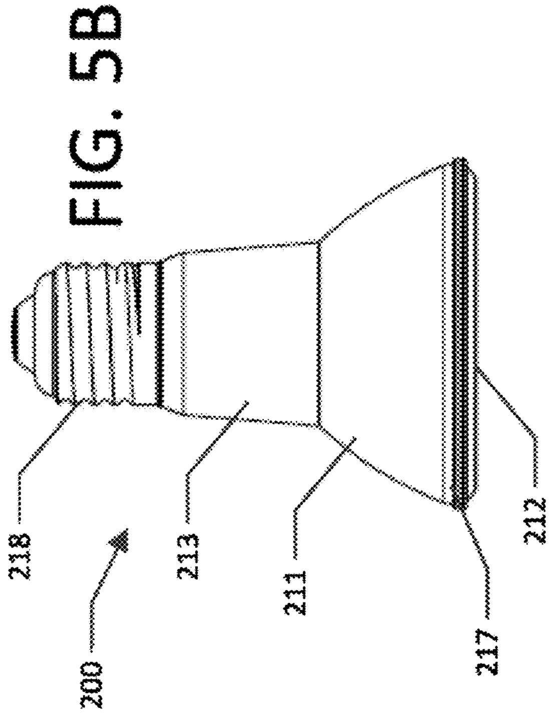
Figure 5D:
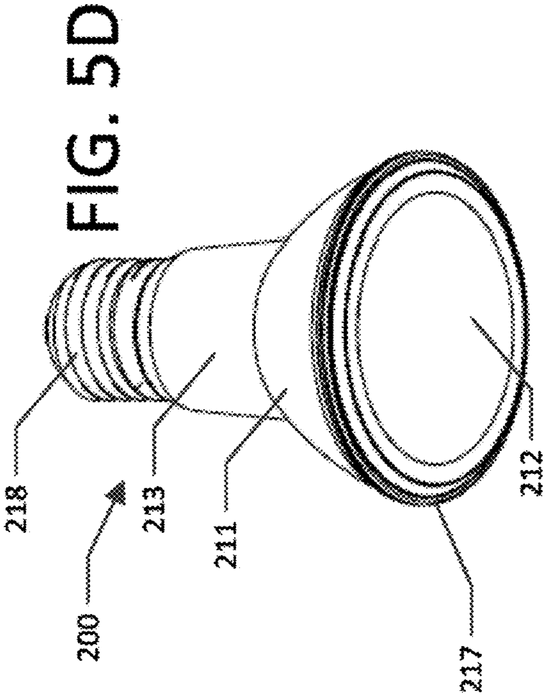
Figure 5A:
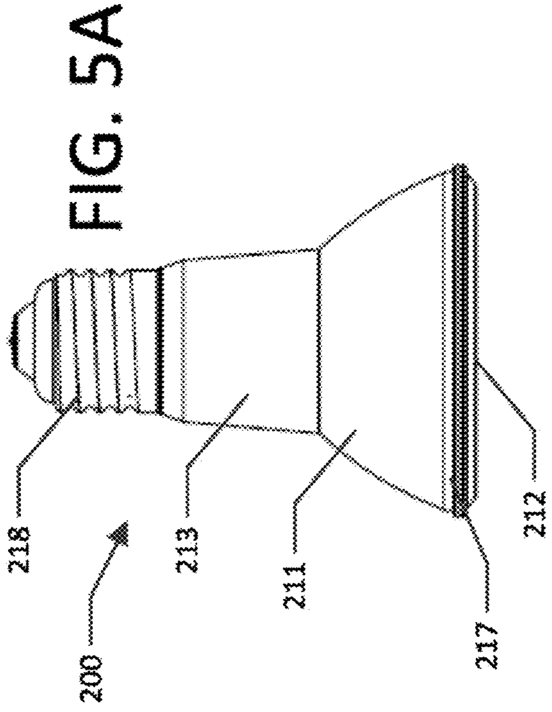
Figure 5C:
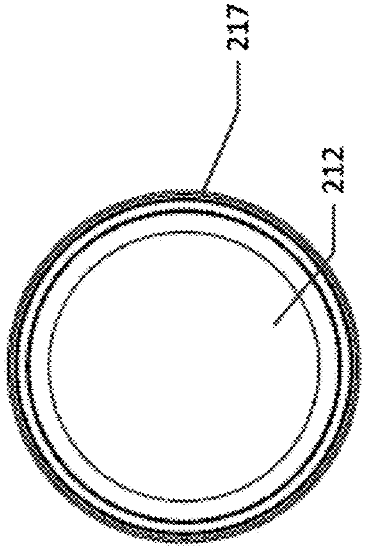
Figure 6:
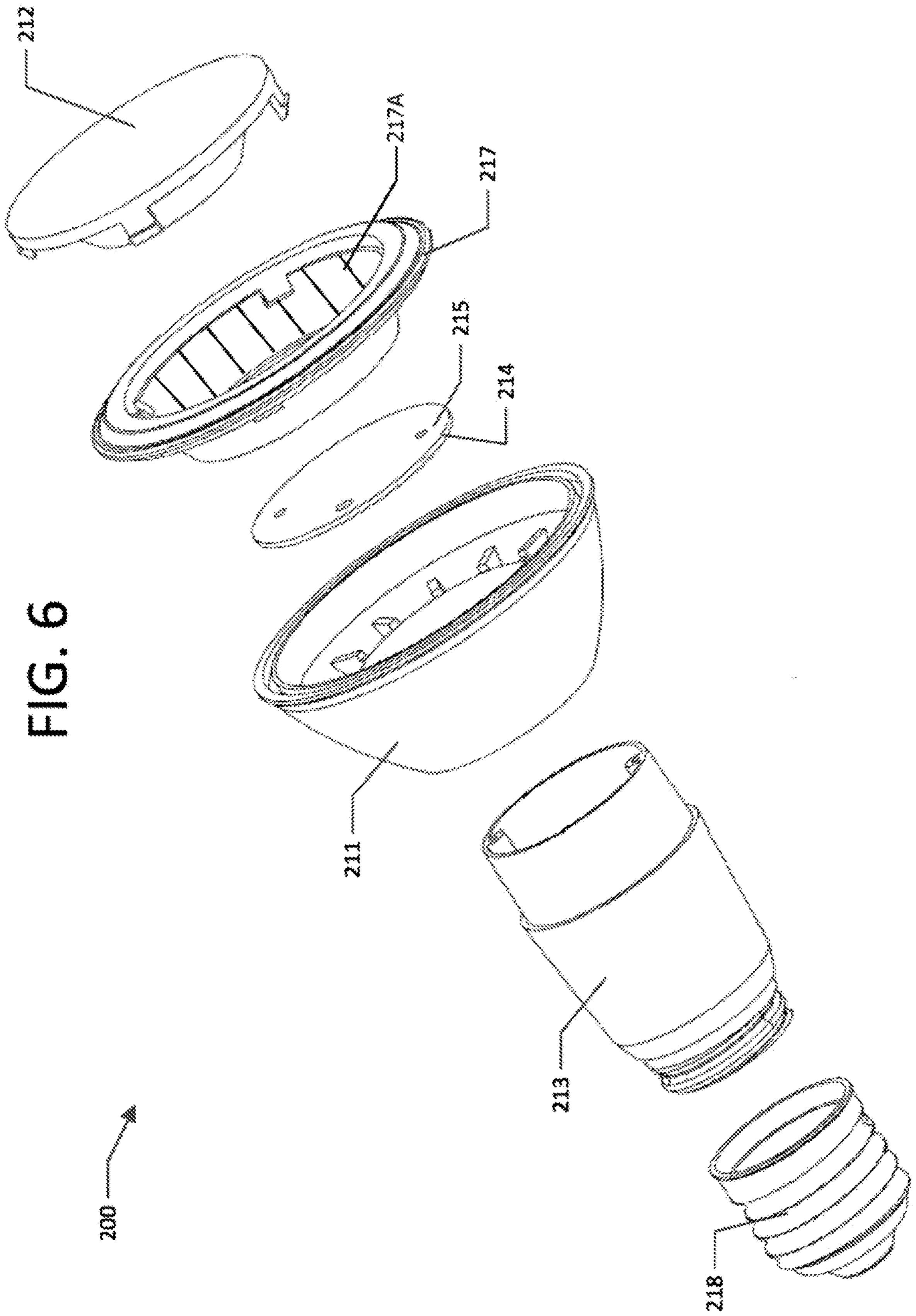
Figure 7A:
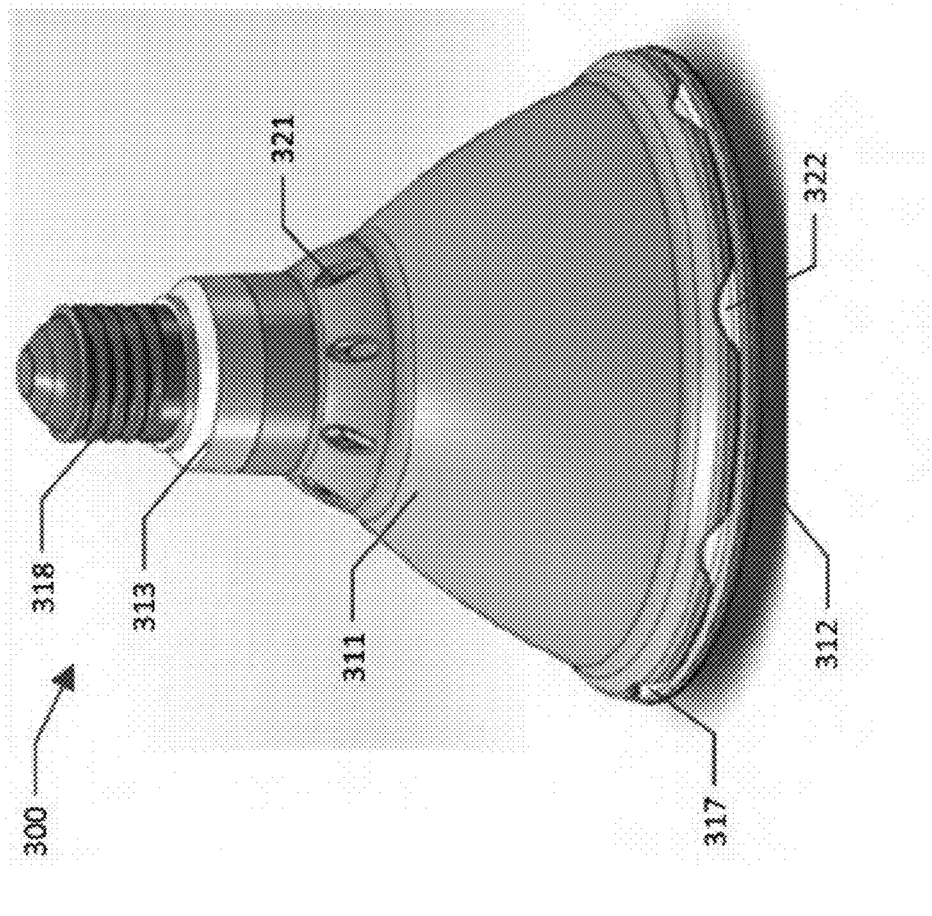
Figure 7B:
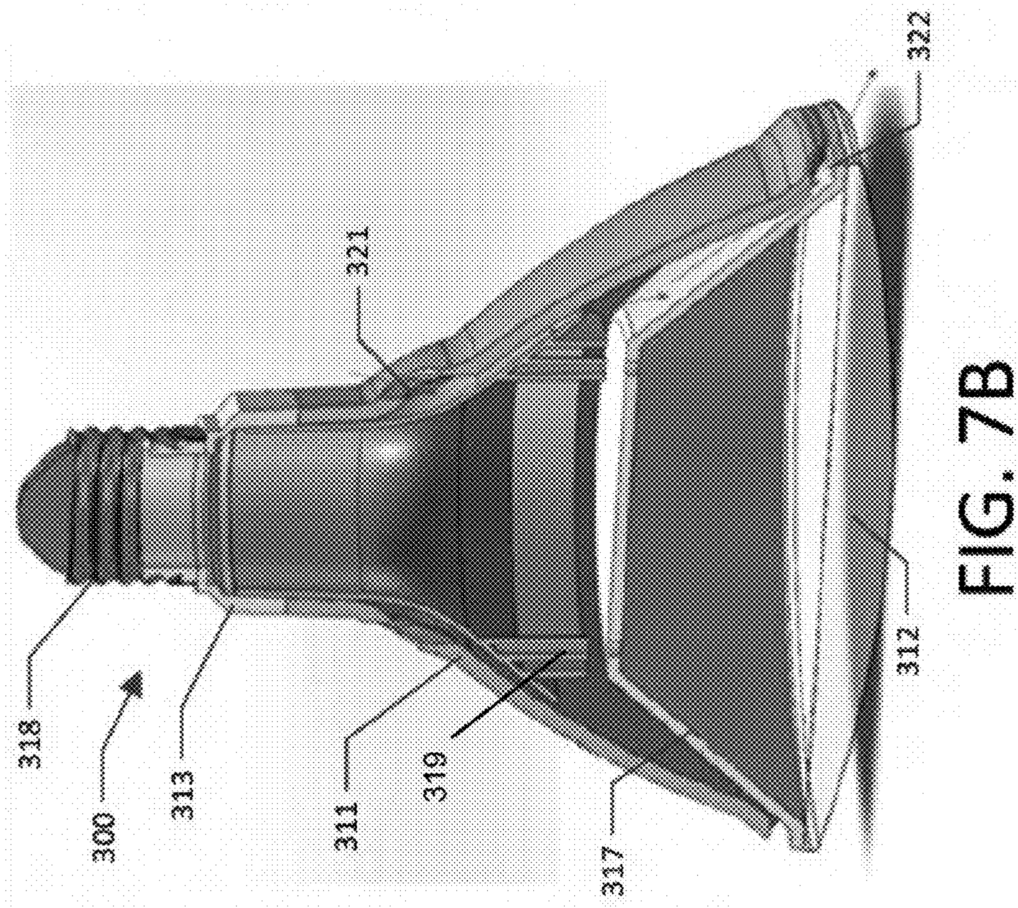
Figure 8B:
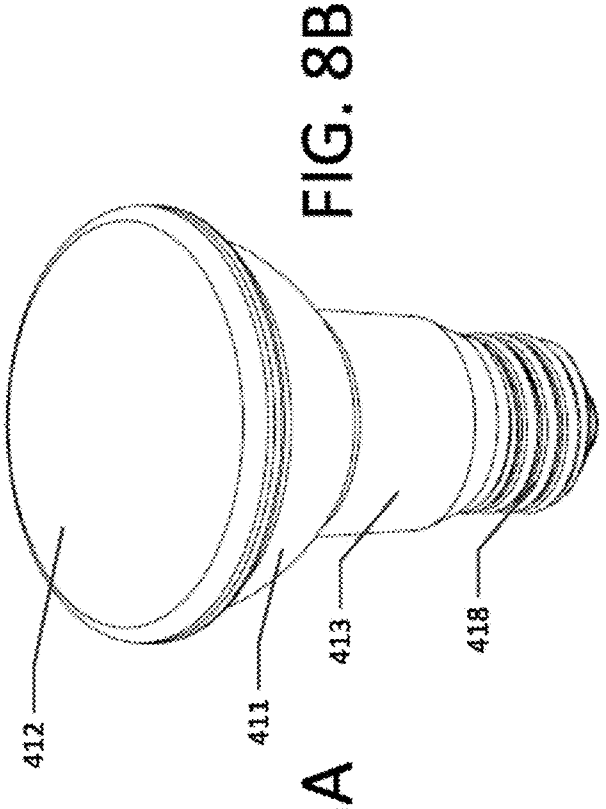
Figure 8A:
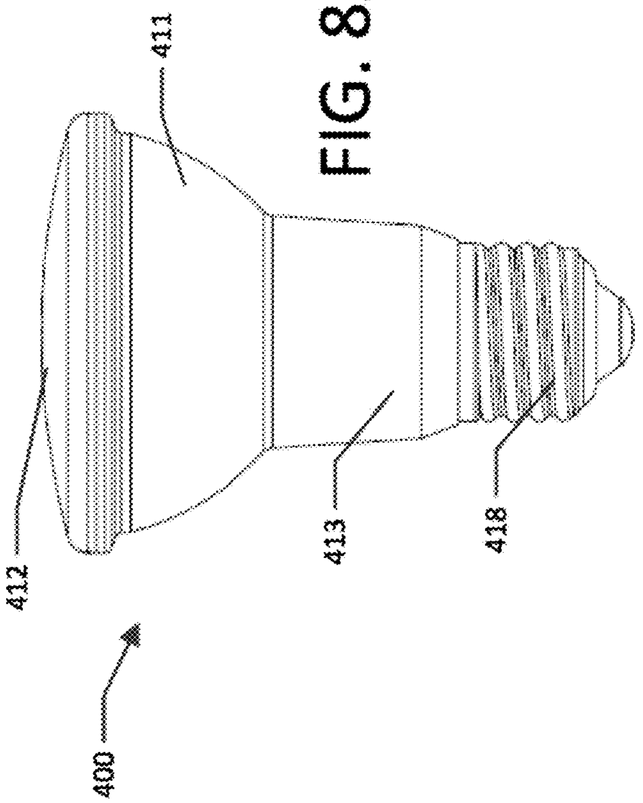
Figure 8C:
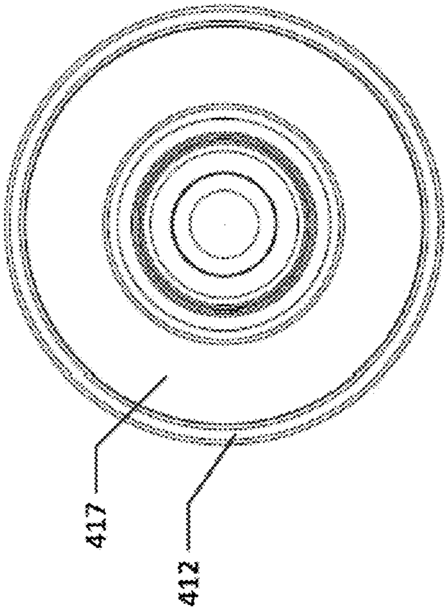
Figure 9:
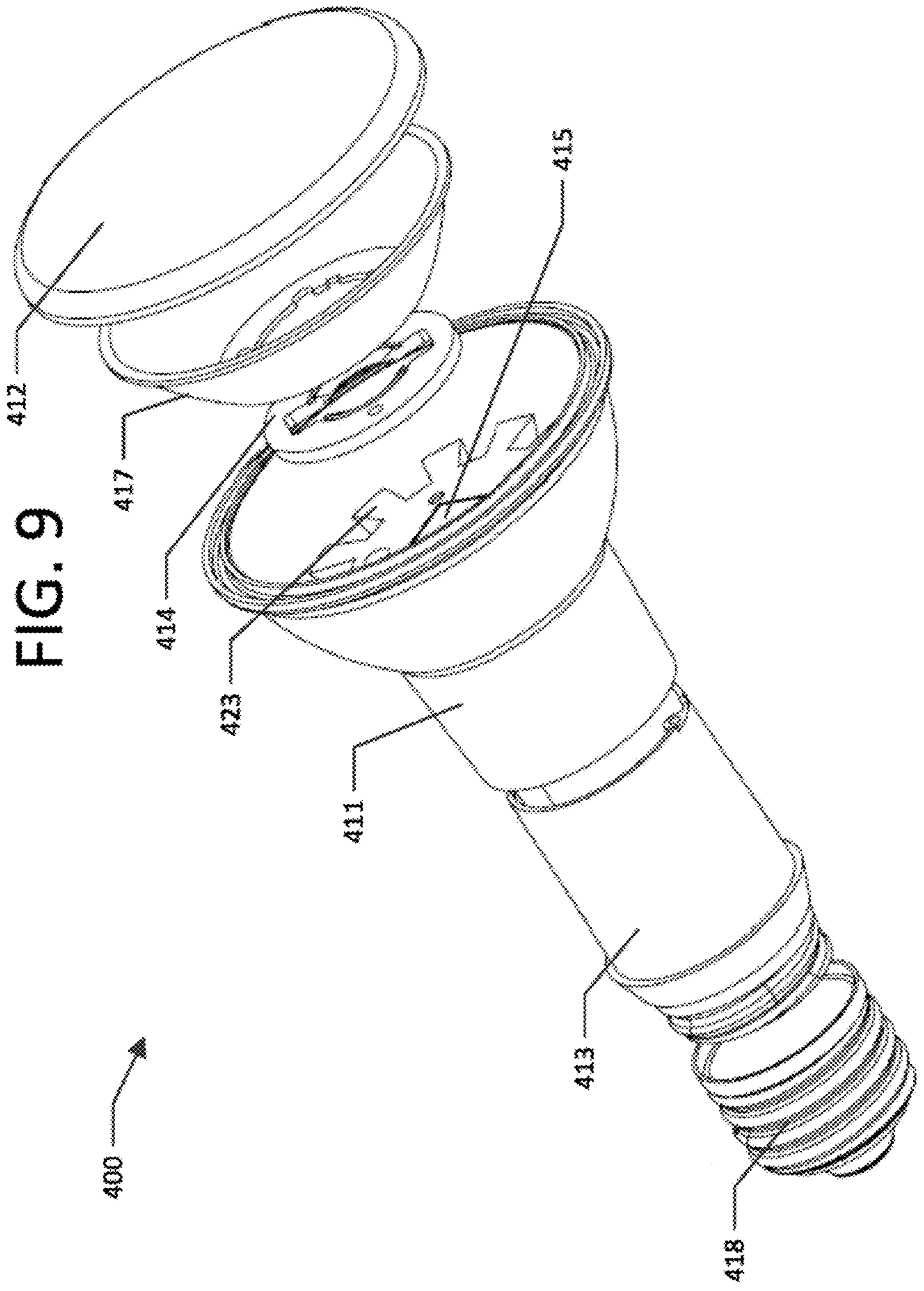
Figure 10A:
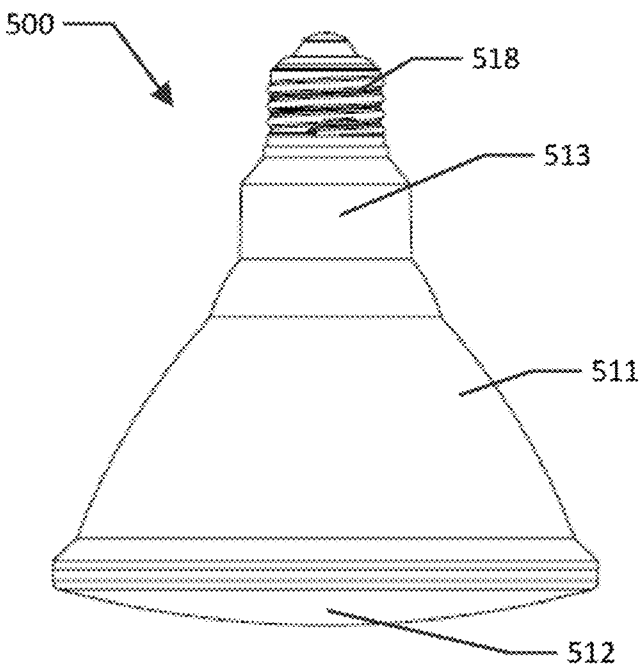
Figure 10B:
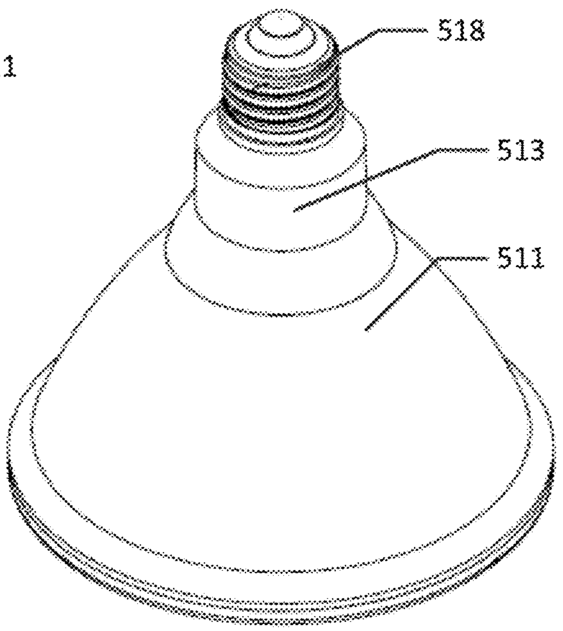
Figure 10C:
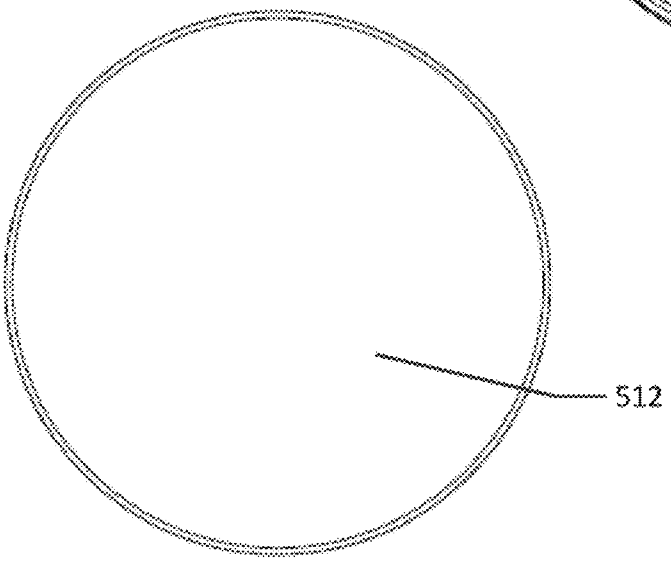
Figure 11:
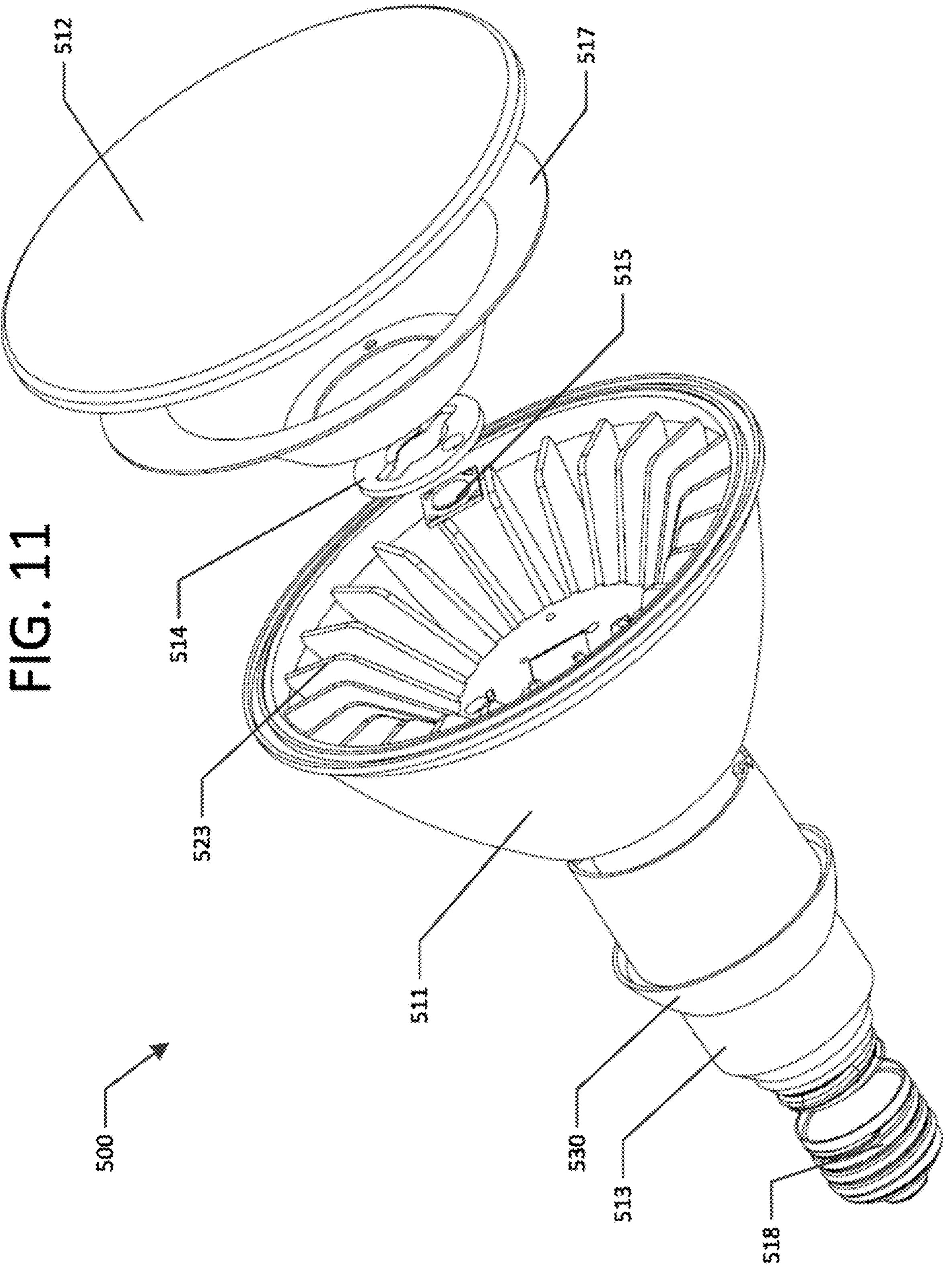
Figure 13:
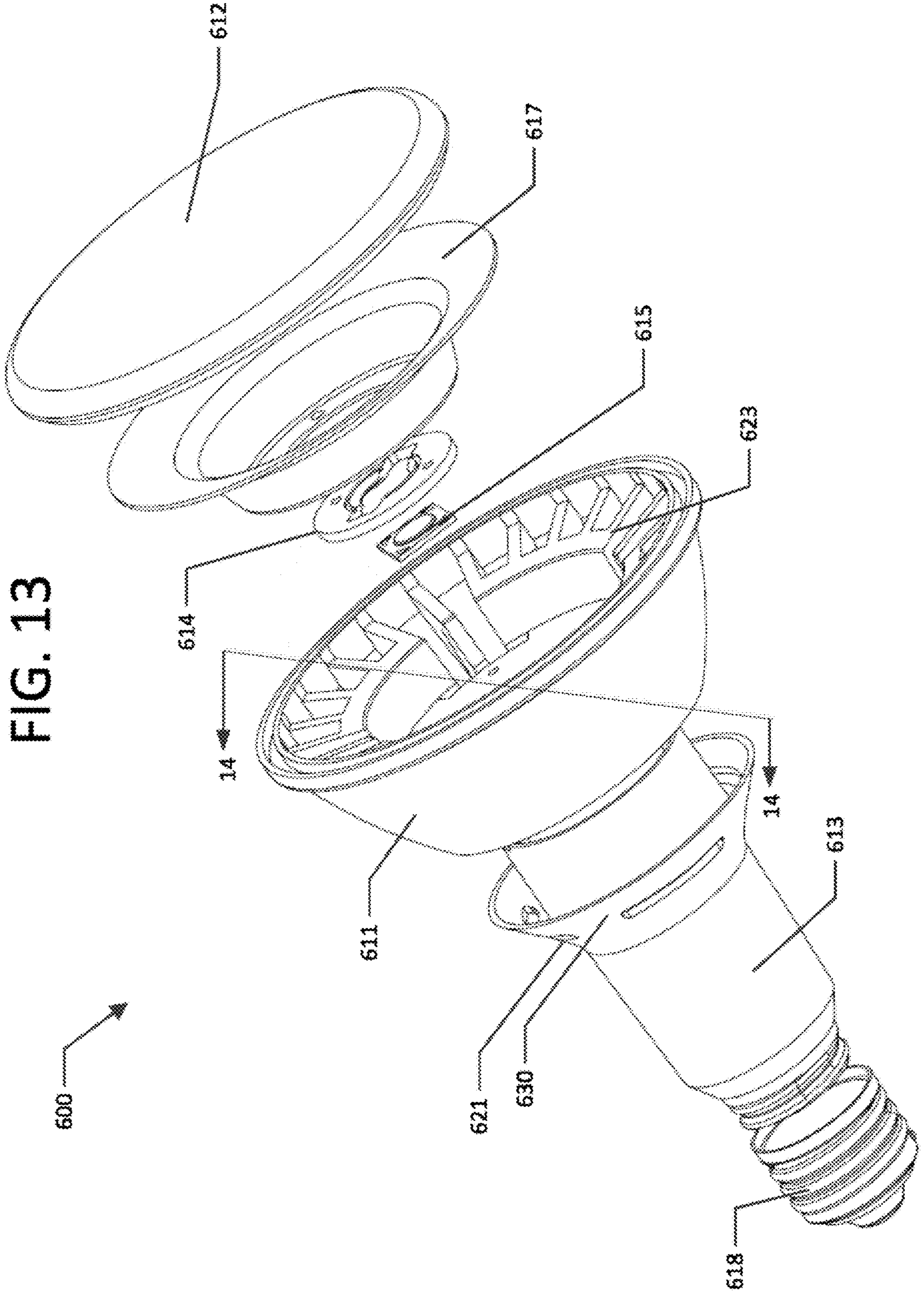
Figure 14:
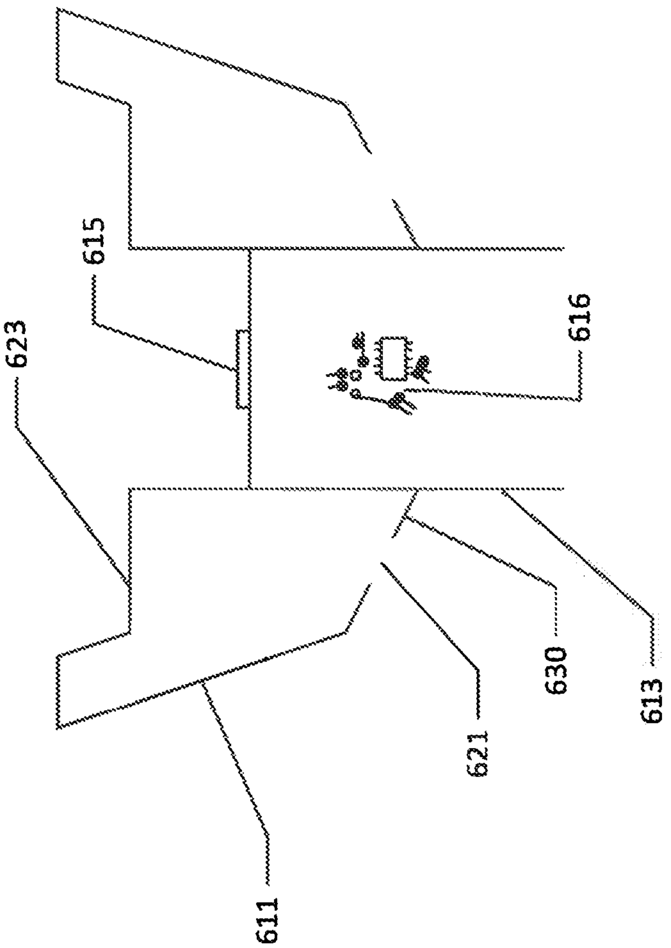

FIGS. 3A, 3B, 3C, and 3D each show a perspective view of an LED flood lamp in accordance with a second exemplary and non-limiting embodiment of the present invention;

FIG. 4 provides an exploded view of the LED flood lamp illustrated in FIGS. 3A-3D;

FIGS. 5A, 5B, 5C, and 5D each show a perspective view of an LED flood lamp in accordance with a third exemplary and non-limiting embodiment of the present invention;

FIG. 6 provides an exploded view of the LED flood lamp illustrated in FIGS. 5A-5D;

FIG. 7A shows a perspective view of an LED flood lamp in accordance with a fourth exemplary and non-limiting embodiment of the present invention;

FIG. 7B shows a cross-sectional view of the LED flood lamp shown in FIG. 7A;

FIGS. 8A, 8B, and 8C each show a perspective view of an LED flood lamp in accordance with a fifth exemplary and non-limiting embodiment of the present invention;

FIG. 9 provides an exploded view of the LED flood lamp illustrated in FIGS. 8A-8C;

FIGS. 10A, 10B, and 10C each show a perspective view of an LED flood lamp in accordance with a sixth exemplary and non-limiting embodiment of the present invention;

FIG. 11 provides an exploded view of the LED flood lamp illustrated in FIGS. 10A-10C;

FIGS. 12A, 12B, and 12C each show a perspective view of an LED flood lamp in accordance with a seventh exemplary and non-limiting embodiment of the present invention;

FIG. 13 provides an exploded view of the LED flood lamp illustrated in FIGS. 12A-12C; and FIG. 14 provides a cross-sectional view of the LED flood lamp illustrated in FIGS. 12A, 12B, 12C, and 13.

Additional details regarding various features illustrated within the figures are described in further detail below.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
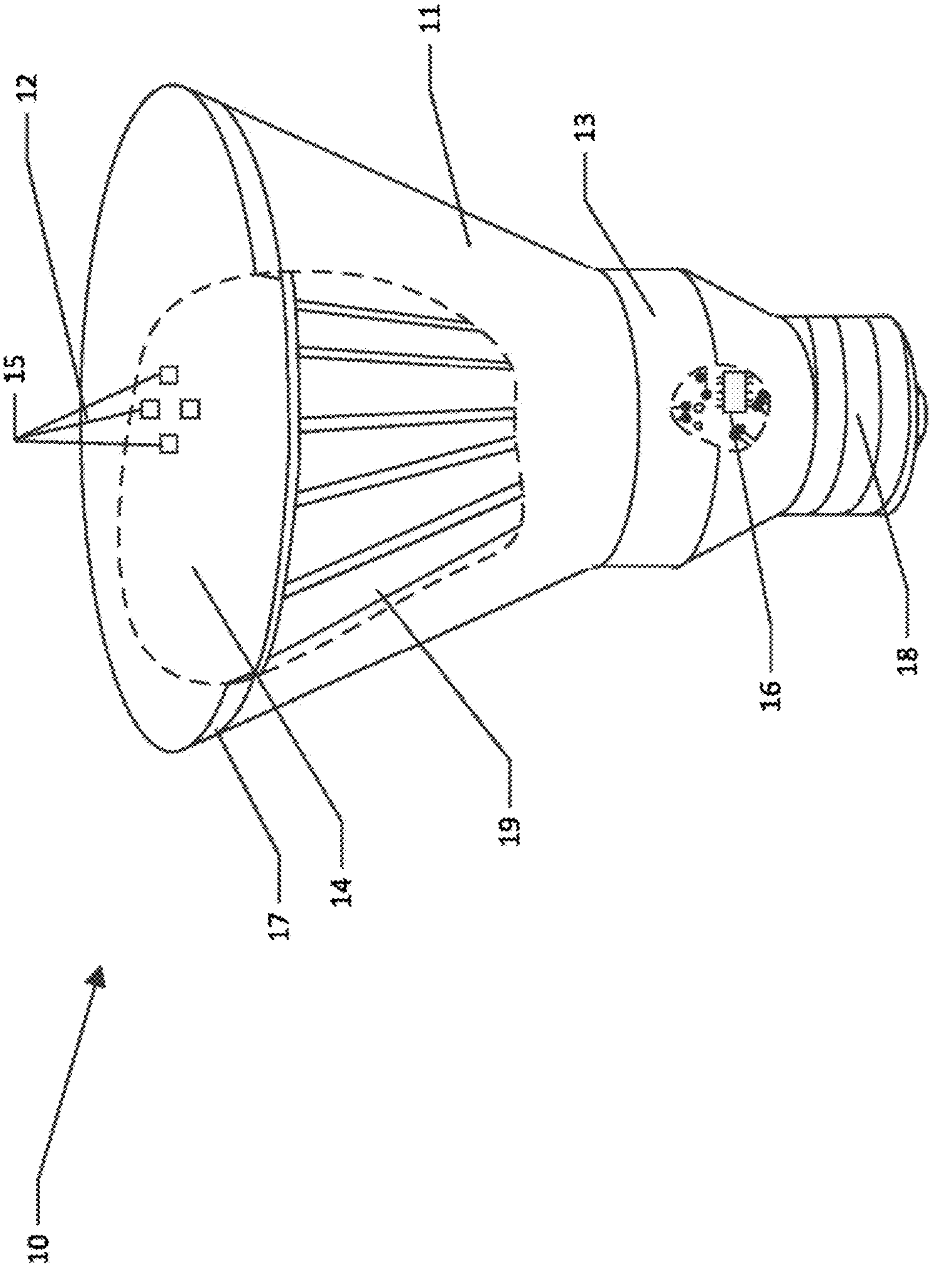
FIG. 1 shows a partial cut-away view of an LED flood lamp, in accordance with a first exemplary and non-limiting embodiment of the present invention.

As shown in FIG. 1, a first exemplary LED flood lamp 10 may according to various embodiments comprise a base cap 18, a first housing 13, a second housing 11, a reflector 17, and a lens 12. In certain embodiments, the LED flood lamp 10 may also comprise an LED mounting surface 14, upon which at least one LED 15 may be mounted. In some embodiments, the LED flood lamp 10 may further comprise driver circuitry 16. In some embodiments, the LED flood lamp 10 may comprise a heat sink 19. In still other embodiments, a portion of the LED flood lamp 10, for example the second housing 11 and/or the reflector 17, may be configured to act as a heat sink.

In any of the above-described embodiments, the combination of the base cap 18, the first housing 13, the second housing 11, the reflector 17, and the lens 12 may provide a sealed LED flood lamp 10. In other words, various combinations of the base cap 18, the first housing 13, the second housing 11, the reflector 17, and/or the lens 12 may provide a chamber within the LED flood lamp 10 that is protected from water, humidity, dust, and/or the like. In other embodiments, the first housing 13, the second housing 11, the reflector 17, and/or the lens 12 may comprise one or more vents. For example, in the fourth exemplary embodiment illustrated in FIGS. 7A and 7B, the second housing 311 includes vent holes 321, 322. In various embodiments, the vents may allow fluid (e.g., air, water, and/or the like) to pass through a portion of the LED flood lamp 10 and assist with radiating heat away from the LED flood lamp.

Figure 2B:
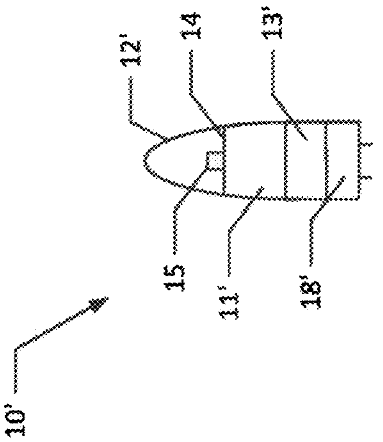
FIG. 2B illustrates an example LED flood lamp shown in FIG. 2A.
Figure 2A:
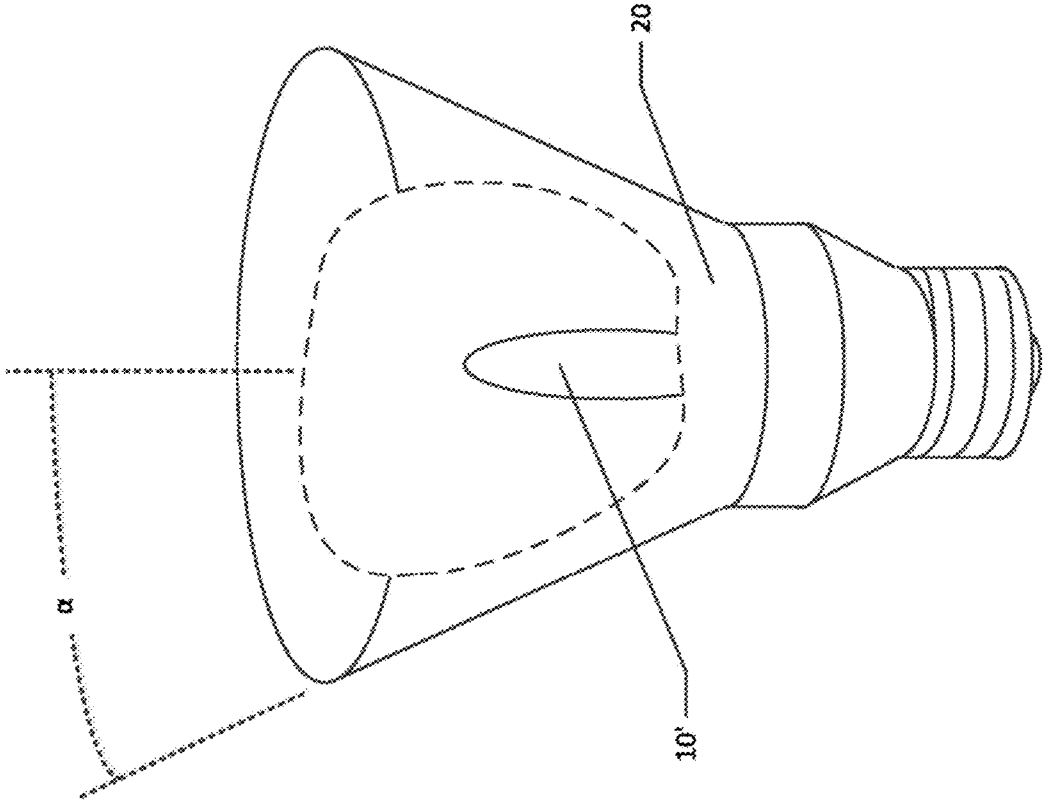
FIG. 2A shows a partial cut-away view of an LED flood lamp which has been incorporated into a traditional PAR halogen lamp housing according to various embodiments of the present invention.

FIGS. 2A and 2B show at least one embodiment in which an LED flood lamp 10' is a separate assembly within a partial or complete conical reflector housing 20. Reflector housing 20 may be a traditional PAR or MR halogen lamp housing. Thus, in some such embodiments, an LED flood lamp 10' may be configured as a "bulb within a bulb." In other words, the LED flood lamp 10' may be a self-contained bulb that is configured to be placed within a traditional bulb housing (e.g., 20). In such embodiments, the LED flood lamp 10' may comprise a lens 12' configured to disperse the light emitted by the at least one LED 15 in a manner similar to the light dispersal from the filament of a halogen lamp, a first housing 13' and a second housing 11' configured to provide structural support for the electrical components and/or dissipate heat generated by the electrical components, and an LED mounting surface 14 upon which the at least one LED 15 may be mounted. The LED flood lamp 10' may also comprise a base cap 18' configured to mechanically secure the LED flood lamp 10' to the reflector housing 20 and/or be in electrical communication with an electrical power source (e.g., via the reflector housing 20). The LED flood lamp 10' may further comprise driver circuitry 16 and/or a heat sink (e.g., similar to heat sink 19 illustrated in FIG. 1). In some embodiments, the LED flood lamp 10' comprises reflector 17 and/or other optical components. In other embodiments, the partial or complete conical reflector housing 20 integrally comprises reflector 17 and/or lens 12.

FIGS. 3A, 3B, 3C, 3D, and 4 will now be referenced to describe a second exemplary and non-limiting embodiment of an LED flood lamp 100.

Generally considered, various embodiments of the second exemplary embodiment of the LED flood lamp 100 may comprise a base cap 118 configured to mechanically and/or electrically connect the LED flood lamp to a lighting fixture and/or the like. The base cap 118 may be configured to secure the LED flood lamp within the socket. For example, the base cap 118 may be configured to screw, snap, rotate into the socket or secure the LED flood lamp 100 via a friction fitting. The base cap 118 may be any of a variety of base caps commonly known in the art. For example, in various embodiments, base cap 118 may comprise a threaded portion configured to screw the LED flood lamp 100 into a light socket. In other embodiments, base cap 118 may comprise a two pin, turn and lock, bayonet, or other mechanism configured to facilitate engagement and/or locking relative to an adjacent light socket, as is commonly known and understood in the art.

In various embodiments, the base cap 118 may be configured to secure the LED flood lamp into a socket of a lighting fixture, lamp, wall sconce, can, spotlight, or other socket. The base cap 118 may be configured to connect the electrical components of the LED flood lamp (e.g., driver circuitry 16 and/or the at least one LED 115) to line voltage or to another source of electrical power. For example, the base cap 118 maybe include one or more electrical contacts configured to provide an electrical connection to corresponding contacts within the socket. The base cap 118 may also be configured to receive the electrical power and transmit the electrical power to the driver circuitry 16.

In various embodiments, base cap 118 is made of metal, such as aluminum, stainless steel, or the like, or any other material commonly known and recognized to be suitable for such applications. For example, the base cap 118 may be an E26, E27, E11, E12, E14, E17, side double prong, bottom double prong, pin, wedge, E39, E40, GU, and/or other base.

In various embodiments, the LED flood lamp 100 comprises a first housing 113. The first housing is configured to at least provide structural support for the LED flood lamp. For example, the first housing 113 may be configured to be a rigid and/or a light-weight housing. For example, the first housing 113 may be made of plastic or other appropriate material. In various embodiments, the first housing may be configured to connect the base cap 118 to the flood lamp 100.

In various embodiments, the driver circuitry 16 may be mounted within the first housing 113. In various embodiments of the LED flood lamp 100, the driver circuitry may be configured to condition and/or control the electrical current received from the electrical power source (e.g., via the base cap 118) and provided to the at least one LED 115. In various embodiments, the driver circuitry 16 may be integrally mounted to an interior wall of the first housing 113, mounted on a board positioned within first housing (e.g., secured along a cross-section of the first housing, suspended along the axis of the first housing), and/or the like.

In various embodiments, driver circuitry 16 may comprise various circuitry portions. In various embodiments, driver circuitry 16 may comprise circuitry portions configured to convert alternating current to direct current, convert the electrical power received via the electrical power source (e.g., via the base cap 118), and/or control the light function of the LEDs, such as allowing the LEDs to be dimmed or the like. The driver circuitry 16 may comprise circuitry portions which are distinct or circuitry portions configured to enact various functions, such as the examples listed above, with a single circuitry portion. A variety of driver circuitry 16 is known and well understood in the art. In some embodiments, the driver circuitry 16 may be mounted in the base cap 118, or other position within the LED flood lamp 100.

The LED flood lamp 100 may further comprise a second housing 111. The second housing 111 may be configured to provide structural support for the LED flood lamp 100, act as a heat sink for the electrical components of the LED flood lamp (e.g., the driver circuitry 16, the at least one LED 115, and/or the like), act as a heat radiator, and/or the like. For example, the second housing 111 may be configured to absorb heat emitted by the electrical components of the LED flood lamp 100 and/or radiate the heat emitted by the electrical components into the environment surrounding the LED flood lamp.

In various embodiments, the second housing 111 may be at least partially conical in shape (e.g., part of the second housing 111 may be shaped as a partial right circular cone). For example, the second housing 111 may have a circular, elliptical, polygonal, or irregular cross-section. The cross-sectional diameter of the second housing 111 may increase uniformly over at least part of the length of the second housing. The end of the second housing 111 having the smaller cross-sectional diameter may be configured to securely attach to the first housing 113. A longitudinal axis of the second housing 111 may be defined such that FIGS. 3A and 3B are related by a rotation of the LED flood lamp 100 about the longitudinal axis of the second housing. For example, the longitudinal axis of the second housing 111 may be the axis of the partial cone that defines the partially conical shape of the second housing, in some embodiments. In at least one embodiment, the second housing may be substantially frusto-conical in shape, as such term is commonly known and understood to define a shape corresponding to the frustum of a cone.

As noted above, the second housing 111 may be configured to act as a heat sink and/or a heat radiator. Thus, in various embodiments, the second housing 111 may be made of aluminum and/or other appropriate material. In various embodiments, the second housing 111 may be finished to provide a shiny silver appearance or finished in another manner to provide an aesthetically pleasing appearance.

In various embodiments, the LED flood lamp 100 comprises a reflector 117. The reflector 117 may be a partially conical reflector (e.g., at least a portion of the reflector 117 may be shaped as a partial right circular cone). For example, the reflector 117 may have a circular, elliptical, polygonal, or irregular cross-section. The cross-sectional diameter of the reflector 117 may increase uniformly over at least part of the length of the reflector. In some embodiments, the shape of the reflector 117 may substantially mirror the shape of the second housing 111, in part or in its entirety. In various embodiments, the reflector 117 may be configured to at least partially fit within the second housing 111. The reflector 117 may be configured to securely attach to the second housing 111. A longitudinal axis of the reflector 117 may be defined such that FIGS. 3A and 3B are related by a rotation of the LED flood lamp 100 about the longitudinal axis of the reflector. For example, the longitudinal axis of the reflector 117 may be the axis of the partial cone that defines the partially conical shape of the second housing, in some embodiments. The reflector 117 may be securely attached to the second housing 111 such that the longitudinal axis of the reflector is aligned with the longitudinal axis of the second housing. Thus, in embodiments of the LED flood lamp 100 having rotational symmetry, the longitudinal axis of the second housing 111 and/or the longitudinal axis of the reflector 117 may define a rotational axis of symmetry of the LED flood lamp. In at least one embodiment, the reflector may be substantially frusto-conical in shape, as such term is commonly known and understood to define a shape corresponding to the frustum of a cone.

In various embodiments, the reflector 117 may also be configured to act as a heat sink and/or heat radiator for the electrical components of the LED flood lamp 100 (e.g., the driver circuitry 16, the at least one LED 115, and/or the like). For example, the reflector 117 may be configured to absorb heat emitted by the electrical components of the LED flood lamp 100 and/or radiate the heat emitted by the electrical components into the environment surrounding the LED flood lamp.

In various embodiments, the reflector 117 may be configured to condition the light emitted by the LED flood lamp 100. For example, the reflector 117 may be configured to reflect at last some of the light incident upon it and emitted by the at least on LED 115 to condition the beam of light emitted by the LED flood lamp 100. For example, the reflector 117 may be configured to condition the light emitted by the at least one LED 115 into a beam having an opening angle $\alpha$ defined by the angle between the longitudinal axis of the reflector and the opening of the reflector opposite the second housing 111 as shown in FIG. 2A. In the case of an at least partially conical reflector 117, the light emitted by the at least one LED 115 may be conditioned into a beam having an opening angle of approximately the same opening angle defined by the partial cone that defines the shape of the reflector.

To provide at least the above-noted benefits and advantages, in various embodiments, the internal surface of the reflector 117 may be smooth. In other embodiments, the internal surface of the reflector 117 may be multi-faceted. For example, the internal surface of the reflector 117 may be at least partially covered in a uniform pattern of reflective surfaces. The reflective surfaces may be configured to reflect light incident thereupon such that the reflected light is incident upon the lens 112, the edges of the beam of light emitted by the LED flood lamp 100 are well defined, and/or is otherwise conditioned as appropriate for the application. In various embodiments, the internal surface of the reflector 117 may be configured to condition the light emitted by the at least one LED 215 into a beam emitted along the longitudinal axis of the reflector.

In various embodiments, the reflector 117 may be made of plastic, ceramic material, metal, aluminum, glass, hard-pressed glass or some other suitable material. In various embodiments, the exterior surface of the reflector 117 may be coated with a coating 117A that provides a shiny silver appearance. In some such embodiments, the exterior surface of the reflector 117 may be aluminized to provide a shiny silver appearance or finished to provide an aesthetically pleasing appearance.

In various embodiments, the internal surface of the partially conical reflector 117 may be configured to control the beam spread. In various embodiments, the reflector 117 may be configured to confine the beam to an angle of 7-70 degrees. In various embodiments, the reflector 117 may be configured to confine the beam to an angle of less than 8 degrees. In other embodiments, the reflector 117 may be configured to confine the beam to an angle of 8-15 degrees, 8-20 degrees, 24-30 degrees, 35-40 degrees, or 55-60 degrees. In yet other embodiments, the reflector 117 may be configured to confine the beam to an angle of greater than 60 degrees (e.g., 68 degrees) or any suitable angle.

In various embodiments, a lens 112 or other light diffuser may be affixed atop the reflector 117, enclosing the at least one LED 115 within the LED flood lamp 100. For example, in various embodiments, the lens 112 maybe secured via a snap-on connection, a friction fit, adhesive, and/or the like.

In various embodiments, the surface of lens 112 may be textured or patterned. For example, the surface of the lens 112 may have a uniform or irregular pattern, texture, or translucent/opaqueness pattern may thereon. In other embodiments, the surface of lens 112 may be substantially smooth, as may be desirable in certain applications. In some embodiments, the lens 112 may be concave, convex, or substantially flat (e.g., approximately planar). For example, in embodiments wherein the lens 112 is substantially flat, the lens may be approximately a plane that is substantially perpendicular to the longitudinal axis of the reflector 117. In embodiments wherein the lens 112 is concave or convex, the optical axis of the lens may be aligned with the longitudinal axis of the reflector 117. Therefore, the reflector 117 and the lens 112 may be configured to condition the beam of light emitted from the LED flood lamp.

In various embodiments, the lens 112 may be configured to act as an optic controller. In various embodiments, the lens 112 may act to give the appearance of a sharp beam edge without the use of a mask. In various embodiments, the lens 112 may be made out of glass. In other embodiments, the lens 112 may be made out of hard glass. In some embodiments, the lens 112 may be made out of plastic or some other commonly known and used material.

In various embodiments, the lens 112 may be configured to allow at least a fraction of the light emitted by the at least one LED 115 to pass through the lens 112. In particular embodiments, the lens 112 may be configured to allow at least 10% of the light emitted by the at least one LED 115 to pass through the lens. In various embodiments, the lens 112 may be configured to allow 10-95% of the light emitted by the at least one LED 115 to pass through the lens. In other embodiments, the lens 112 may be configured to allow 5-25%, 20-50%, 40-60%, 50-80% of the light emitted by the at least one LED 115 to pass through the lens. In some embodiments, the lens 112 may be configured to allow a significant fraction of light emitted by the at least one LED to pass through the glass lens. In particular embodiments, the lens 112 may be configured to allow greater than 50% or greater than 80% of the light emitted by the at least one LED 115 pass through the lens. In various embodiments, the translucency of the lens 112 may not be uniform across the entire lens. For example, in one embodiment, the center portion of the lens 112 may be configured to allow 90% of the light incident thereon to pass through the lens, while the outermost portion of the lens may be configured to allow less than 5% of the light incident thereon to pass through the lens. The translucency of the lens 112 may vary smoothly, in striations, or irregularly over the surface of the lens.

In various embodiments, the lens 112 may be configured to control the beam spread. In some embodiments, the lens 112 may act as an optics controller. In various embodiments, the lens 112 may be configured to confine the beam to an angle of 7-70 degrees. In various embodiments, the lens 112 may be configured to confine the beam to an angle of less than 8 degrees. In other embodiments, the lens 112 may be configured to confine the beam to an angle of 8-15 degrees, 8-20 degrees, 24-30 degrees, 35-40 degrees, or 55-60 degrees. In yet other embodiments, the lens 112 may be configured to confine the beam to an angle of greater than 60 degrees (e.g., 68 degrees) or any angle appropriate for the application. For example, in some embodiments, the lens 112 may be transparent and/or translucent across the entire lens. In other embodiments, the lens 112 may be at least partially opaque around the edge of the lens and transparent and/or translucent in the center of the lens. For example, the lens 112 may be configured to allow more light to pass through the center of the lens and less light to pass through the edge of lens. In some embodiments, the shape of the lens (e.g., concave, convex, or substantially flat) may be configured to control the beam. For example, the curvature of the lens 112 may be configured to focus the beam of light emitted by the LED flood lamp 100 into a beam of a particular opening angle, width, and/or the like. As noted above, the reflector 117 may be configured to condition the beam of light emitted by the LED flood lamp 100 in place of and/or in addition to the lens 112.

In various embodiments, at least one LED 115 may be mounted within the LED flood lamp 100 such that light emitted by the at least one LED 115 is generally directed toward the lens 112. In various embodiments, the at least one LED 115 may be secured within the second housing 111 and/or the reflector 117. In various embodiments, the at least one LED 115 may have a light temperature of 2800-3200 K. In other embodiments, the at least one LED 115 may have a light temperature of around 2000-2800 K. In still other embodiments, the at least one LED 115 may have a light temperature of around 3000-7000 K.

In yet other embodiments, the at least one LED 115 may be a colored LED, such as a red, green, or blue LED. In various embodiments, the one or more LED 115 secured within the LED flood lamp 100 may be different colors. For example, one embodiment may have three red LEDs, three green LEDs and 10 white LEDs mounted within the LED flood lamp 100. In some such embodiments, the different color LEDs may be controlled independently. For example, in such an embodiment, any red LEDs secured within the LED flood lamp 100 may be controlled independently from any green LEDs secured within the LED flood lamp 100, or the like.

In various embodiments, the at least one LED 115 may be configured to provide light of at least 200 lumens. In some embodiments, the at least one LED 115 may be configured to provide light of at least 1,000 lumens. In other embodiments, the at least one LED 115 may be configured to provide light of at least 2,500 lumens. In still other embodiments, the at least one LED 115 may be configured to provide light of at least 5,000 lumens. In yet other embodiments, the at least one LED 115 may be configured to provide light of at least 7,500 lumens. In still other embodiments, the at least one LED 115 may be configured to provide a beam of any of a variety of lumens, as may be desirable for various applications.

In various embodiments, an LED flood lamp 10 may further comprise a heat sink 19. As noted above, in some embodiments, the second housing 111 and/or the reflector 117 may be configured to act as a heat sink. In embodiments wherein the second housing 111 and/or the reflector 117 are configured to act as the heat sink, the following discussion of the heat sink 19 may also relate to the second housing and/or the reflector. In other embodiments, the LED flood lamp 100 may comprise a distinct and separate heat sink component 19 relative to those elements previously described herein. In various such embodiments, the heat sink 19 may be partially conical in shape. In various embodiments, the shape of the heat sink 19 may substantially mirror the shape of the second housing 111. A longitudinal axis may be defined along the length of the heat sink 19. In various embodiments, the longitudinal axis of the heat sink 19 may be aligned with the longitudinal axis of the second housing 111. In some such embodiments, the heat sink 19 may comprise a plurality of fins transverse to the partially conical structure of the heat sink. In other embodiments, the heat sink 19 may be smooth or ribbed or otherwise configured. In embodiments wherein the heat sink comprises a ribbed partially conical structure, the ribs may be parallel or transverse to the axis of the partially conical structure. In various embodiments, the heat sink 19 may comprise slits in the partially conical structure of the heat sink. In various embodiments, heat sink may be made of aluminum or some other suitable material. In various embodiments, the heat sink may be mounted within the first housing 113, the second housing 111, and/or reflector 117. In other embodiments, the heat sink 19 may be constructed from any of a variety of materials and/or mounted in any of a variety of way within the LED flood lamp 100, as may be desirable for purposes of ensuring sufficient heat dissipation.

Heat sink may be configured to dissipate heat produced by the at least one LED 115, driver circuitry 16, and/or other heat source within the LED flood lamp 100. In various embodiments, heat sink may be in contact with the reflector 117 to increase heat dissipation (e.g., the reflector 117 may act as a heat radiator). In other embodiments, the heat sink may not be in contact with the reflector 117 and may dissipate heat by radiating the heat as infrared radiation, or the like. In various embodiments, the heat sink 19 may comprise fins that are configured to radiate heat. In other embodiments, one or more additional components may be incorporated so as to further facilitate heat dissipation, as may be desirable and/or necessary for certain applications.

In some such and still other embodiments, the heat sink may be in contact mechanically with a floodlight assembly, such the non-limiting example of a separate reflector housing 20. In other embodiments, the heat sink may be configured in any of a variety ways, provided such facilitates a desired degree of heat dissipation with respect to the LED flood lamp 100 and associated assembly described herein.

FIGS. 5A, 5B, 5C, 5D, and 6 will now be referenced to describe a third exemplary and non-limiting embodiment of an LED flood lamp 200.

Generally considered, various embodiments of the third exemplary embodiment of the LED flood lamp 200 may comprise a base cap 218 configured to mechanically and/or electrically connect the LED flood lamp to a lighting fixture and/or the like. As described above, the base cap 218 may be configured to secure the LED flood lamp within the socket and/or place the electrical components of the LED flood lamp 200 (e.g., the driver circuitry 16 and/or at least one LED 215) with an electrical power source. In various embodiments, base cap 218 is made of metal, such as aluminum or the like, or any other material commonly known and recognized to be suitable for such applications. For example, the base cap 218 may be an E26, E27, E11, E12, E14, E17, side double prong, bottom double prong, pin, wedge, E39, E40, GU, and/or other base.

In various embodiments, the LED flood lamp 200 comprises a first housing 213. The first housing is configured to at least provide structural support for the LED flood lamp. For example, the first housing 213 may be configured to be a rigid and/or a light-weight housing. For example, the first housing 213 may be made of plastic or other appropriate material. In various embodiments, the first housing may be configured to connect the base cap 218 to the flood lamp 200.

As described above, in various embodiments, the driver circuitry 16 may be mounted within the first housing 213. In other embodiments, the driver circuitry 16 may be mounted on the LED mounting surface 214, in the base cap 218, or other position within the LED flood lamp 200.

The LED flood lamp 200 may further comprise a second housing 211. The second housing 211 may be configured to provide structural support for the LED flood lamp 200, act as a heat sink for the electrical components of the LED flood lamp (e.g., the driver circuitry 16, the at least one LED 215, and/or the like), act as a heat radiator, and/or the like. For example, the second housing 211 may be configured to absorb heat emitted by the electrical components of the LED flood lamp 200 and/or radiate the heat emitted by the electrical components into the environment surrounding the LED flood lamp.

As noted above, in various embodiments, the second housing 211 may be at least partially conical in shape (e.g., part of the second housing 211 may be shaped as a partial right circular cone). For example, the second housing 211 may have a circular, elliptical, polygonal, or irregular cross-section. The cross-sectional diameter of the second housing 211 may increase uniformly over at least part of the length of the second housing. The end of the second housing 211 having the smaller cross-sectional diameter may be configured to securely attach to the first housing 213. A longitudinal axis of the second housing 211 may be defined such that FIGS. 5A and 5B are related by a rotation of the LED flood lamp 200 about the longitudinal axis of the second housing. For example, the longitudinal axis of the second housing 211 may be the axis of the partial cone that defines the partially conical shape of the second housing, in some embodiments.

As noted above, the second housing 211 may be configured to act as a heat sink and/or a heat radiator. Thus, in various embodiments, the second housing 211 may be made of aluminum and/or other appropriate material. In various embodiments, the second housing 211 may be finished to provide a shiny silver appearance or finished in another manner commonly known in the art to provide an aesthetically pleasing appearance.

In various embodiments, the LED flood lamp 200 comprises a reflector 217. The reflector 217 may be a partially conical reflector (e.g., at least a portion of the reflector 117 may be shaped as a partial right circular cone). For example, the reflector 217 may have a circular, elliptical, polygonal, or irregular cross-section. The cross-sectional diameter of the reflector 217 may increase uniformly over at least part of the length of the reflector. In some embodiments, the shape of the reflector 217 may substantially mirror the shape of the second housing 211, in part or in its entirety. In various embodiments, the reflector 217 may be configured to at least partially fit within the second housing 211. The reflector 217 may be configured to securely attach to the second housing 211. A longitudinal axis of the reflector 117 may be defined such that FIGS. 5A and 5B are related by a rotation of the LED flood lamp 200 about the longitudinal axis of the reflector. For example, the longitudinal axis of the reflector 217 may be the axis of the partial cone that defines the partially conical shape of the second housing, in some embodiments. The reflector 217 may be securely attached to the second housing 211 such that the longitudinal axis of the reflector is aligned with the longitudinal axis of the second housing. Thus, in embodiments of the LED flood lamp 200 having rotational symmetry, the longitudinal axis of the second housing 211 and/or the longitudinal axis of the reflector 217 may define a rotational axis of symmetry of the LED flood lamp.

In various embodiments, the reflector 217 may also be configured to act as a heat sink and/or heat radiator for the electrical components of the LED flood lamp 200 (e.g., the driver circuitry 16, the at least one LED 215, and/or the like). For example, the reflector 217 may be configured to absorb heat emitted by the electrical components of the LED flood lamp 200 and/or radiate the heat emitted by the electrical components into the environment surrounding the LED flood lamp.

As described above, in various embodiments, the reflector 217 may be configured to condition the light emitted by the LED flood lamp 200. To provide at least the above-noted benefits and advantages, in various embodiments, the internal surface of the reflector 217 may be smooth. In other embodiments, the internal surface of the reflector 217 may be multi-faceted. For example, the internal surface of the reflector 217 may be at least partially covered in a uniform pattern of reflective surfaces 217A. The reflective surfaces 217A may be configured to reflect light incident thereupon such that the reflected light is incident upon the lens 212, the edges of the beam of light emitted by the LED flood lamp 200 are well defined, and/or is otherwise conditioned as appropriate for the application. In various embodiments, the internal surface of the reflector 217 may be configured to condition the light emitted by the at least one LED 215 into a beam emitted along the longitudinal axis of the reflector.

In various embodiments, the reflector 217 may be made of plastic, ceramic material, metal, aluminum, glass, hard-pressed glass or some other suitable material. In various embodiments, the exterior surface of the reflector 217 may be coated with a coating that provides a shiny silver appearance. In some such embodiments, the exterior surface of the reflector 217 may be aluminized to provide a shiny silver appearance or finished to provide an aesthetically pleasing appearance.

In various embodiments, the internal surface of the partially conical reflector 217 may be configured to control the beam spread. In various embodiments, the reflector 217 may be configured to confine the beam to an angle of 7-70 degrees. In various embodiments, the reflector 217 may be configured to confine the beam to an angle of less than 8 degrees. In other embodiments, the reflector 217 may be configured to confine the beam to an angle of 8-15 degrees, 8-20 degrees, 24-30 degrees, 35-40 degrees, or 55-60 degrees. In yet other embodiments, the reflector 217 may be configured to confine the beam to an angle of greater than 60 degrees (e.g., 68 degrees) or any suitable angle.

In various embodiments, a lens 212 or other light diffuser may be affixed atop the reflector 217, enclosing the at least one LED 215 within the LED flood lamp 200. For example, in various embodiments, the lens 212 may be secured via a snap-on connection, a friction fit, adhesive, and/or the like. For example, the lens 212 may have four prongs configured to snap into corresponding slots located around the opening of the reflector, as illustrated in FIG. 6.

As described above, in various embodiments, the surface of lens 212 may be smooth, textured or patterned. In some embodiments, the lens 212 may be concave, convex, or substantially flat (e.g., approximately planar). For example, in embodiments wherein the lens 212 is substantially flat, the lens may be approximately a plane that is substantially perpendicular to the longitudinal axis of the reflector 217. In embodiments wherein the lens 212 is concave or convex, the optical axis of the lens may be aligned with the longitudinal axis of the reflector 217. Therefore, the reflector 217 and the lens 212 may be configured to condition the beam of light emitted from the LED flood lamp.

In various embodiments, the lens 212 may be configured to act as an optic controller. In various embodiments, the lens 212 may act to give the appearance of a sharp beam edge without the use of a mask. In various embodiments, the lens 212 may be made out of glass. In other embodiments, the lens 212 may be made out of hard glass. In some embodiments, the lens 212 may be made out of plastic or some other commonly known and used material.

In various embodiments, the lens 212 may be configured to allow at least a fraction of the light emitted by the at least one LED 215 to pass through the lens 212. In particular embodiments, the lens 212 may be configured to allow at least 10% of the light emitted by the at least one LED 215 to pass through the lens. In various embodiments, the lens 212 may be configured to allow 10-95% of the light emitted by the at least one LED 215 to pass through the lens. In other embodiments, the lens 212 may be configured to allow 5-25%, 20-50%, 40-60%, 50-80% of the light emitted by the at least one LED 215 to pass through the lens. In some embodiments, the lens 212 may be configured to allow a significant fraction of light emitted by the at least one LED to pass through the glass lens. In particular embodiments, the lens 212 may be configured to allow greater than 50% or greater than 80% of the light emitted by the at least one LED 215 pass through the lens.

In various embodiments, the lens 212 may be configured to control the beam spread. In some embodiments, the lens 212 may act as an optics controller. In various embodiments, the lens 212 may be configured to confine the beam to an angle of 7-70 degrees. In various embodiments, the lens 212 may be configured to confine the beam to an angle of less than 8 degrees. In other embodiments, the lens 212 may be configured to confine the beam to an angle of 8-15 degrees, 8-20 degrees, 24-30 degrees, 35-40 degrees, or 55-60 degrees. In yet other embodiments, the lens 212 may be configured to confine the beam to an angle of greater than 60 degrees (e.g., 68 degrees) or any angle appropriate for the application. For example, in some embodiments, the lens 212 may be transparent and/or translucent across the entire lens. In other embodiments, the lens 212 may be at least partially opaque around the edge of the lens and transparent and/or translucent in the center of the lens. For example, the lens 212 may be configured to allow more light to pass through the center of the lens and less light to pass through the edge of lens. In some embodiments, the shape of the lens (e.g., concave, convex, or substantially flat) may be configured to control the beam. For example, the curvature of the lens 212 may be configured to focus the beam of light emitted by the LED flood lamp 200 into a beam of a particular opening angle, width, and/or the like. As noted above, the reflector 217 may be configured to condition the beam of light emitted by the LED flood lamp 200 in place of and/or in addition to the lens 212.

In various embodiments, at least one LED 215 may be mounted within the LED flood lamp 200 such that light emitted by the at least one LED 215 is generally directed toward the lens 212. In various embodiments, the at least one LED 215 may be secured within the second housing 211 and/or the reflector 217. In some embodiments, the at least one LED 215 may be mounted on a board and/or an LED mounting surface 214. In various embodiments, the at least one LED 215 may have a light temperature of 2800-3200 K. In other embodiments, the at least one LED 215 may have a light temperature of around 2000-2800 K. In still other embodiments, the at least one LED 215 may have a light temperature of around 3000-7000 K.

In yet other embodiments, the at least one LED 215 may be a colored LED, such as a red, green, or blue LED. In various embodiments, the one or more LED 215 secured within the LED flood lamp 200 (e.g., mounted on the LED mounting surface 214) may be different colors. For example, one embodiment may have three red LEDs, three green LEDs and 10 white LEDs mounted within the LED flood lamp 200. In some such embodiments, the different color LEDs may be controlled independently. For example, in such an embodiment, any red LEDs secured within the LED flood lamp 200 may be controlled independently from any green LEDs secured within the LED flood lamp 200, or the like.

In various embodiments, the at least one LED 215 may be configured to provide light of at least 200 lumens. In some embodiments, the at least one LED 215 may be configured to provide light of at least 1,000 lumens. In other embodiments, the at least one LED 215 may be configured to provide light of at least 2,500 lumens. In still other embodiments, the at least one LED 215 may be configured to provide light of at least 5,000 lumens. In yet other embodiments, the at least one LED 215 may be configured to provide light of at least 7,500 lumens. In still other embodiments, the at least one LED 215 may be configured to provide a beam of any of a variety of lumens, as may be desirable for various applications.

In various embodiments, the at least one LED 215 may be mounted on LED mounting surface 214. The mounting board 214 may be configured to provide structural support to the at least one LED 215 and/or to provide an electrical connection between the at least one LED 215 and the driver circuitry 16 or source of electrical power. In various embodiments, the at least one LED 215 may be manufactured on the LED mounting board 214 or the at least one LED 215 may be soldered onto and/or otherwise secured to the LED mounting board. The LED mounting board 214 may be mounted within the second housing 211 and/or the reflector 217 such that light emitted by the at least on LED 215 is generally directed toward the lens 212.

As noted above, in various embodiments, an LED flood lamp 10 may further comprise a heat sink 19. In some embodiments, the second housing 211 and/or the reflector 217 may be configured to act as a heat sink. In other embodiments, the LED flood lamp 200 may comprise a distinct and separate heat sink component 19 relative to those elements previously described herein. The heat sink 19 may be configured to dissipate heat produced by the at least one LED 215, driver circuitry 16, and/or other heat source within the LED flood lamp 200. In various embodiments, the heat sink 19 may be in thermal contact with the LED mounting surface 214. In other embodiments, one or more additional components may be incorporated so as to further facilitate heat dissipation, as may be desirable and/or necessary for certain applications.

In various embodiments, the heat sink may be in mechanical contact with the LED mounting surface 214. In some such embodiments, the LED mounting surface 214 may be affixed atop the heat sink. In some such and still other embodiments, the heat sink may be in contact mechanically with a floodlight assembly, such the non-limiting example of a separate reflector housing 20. In other embodiments, the heat sink may be configured in any of a variety ways, provided such facilitates a desired degree of heat dissipation with respect to the LED flood lamp 200 and associated assembly described herein.

FIGS. 7A and 7B illustrate a fourth exemplary embodiment of an LED flood lamp 300. The LED flood lamp 300 according to various embodiments thereof comprises a base cap 318, a first housing 313, a second housing 311, a reflector 317, a lens 312, and at least one LED (not shown) secured within the LED flood lamp 300. The second housing 311 may be configured to act as a heat sink and/or a heat radiator. For example, the second housing 311 may comprise holes or vents 321, 322 configured to allow air and/or water to flow between the second housing 311 and the reflector 317 or other interior structure of the LED flood lamp 300. In this embodiment, the reflector 317 may comprise an aluminum radiator. In this embodiment, the narrower end of the partially conical reflector may be sealed by a surface attached or integrally formed with the reflector 317 and which may provide an LED mounting surface. The wider end of the partially conical reflector 317 may be sealed by a glass or plastic lens, light diffuser, or cover. In this embodiment, the driver circuitry 16 may be sealed within an internal structure within the first housing 313 or the reflector 317 configured to provide structural integrity to the LED flood lamp 300 and/or to protect the driver circuitry 16 from the environment in the vicinity of the lamp. In this embodiment, the flow of water and/or air between the second housing 311 and the reflector 317 or other internal structure of the LED flood lamp 300 may help the LED flood lamp maintain a cooler operating temperature for more efficient LED operation.

As noted above, in various embodiments the LED flood lamp 300 includes at least one pair of vents 321, 322. The vents 321, 322 may allow fluid (e.g., air, water, and/or the like) to flow through at least a part of the LED flood lamp 300. The vents 321, 322 may be configured to allow the fluid passing through the vents to assist with cooling the LED flood lamp 300. For example, air passing through the vents 321, 322 may be heated by heat emitted by the electrical components of the LED flood lamp 300 (e.g., the driver circuitry 16, at least one LED 215 and/or the like) absorbed and re-emitted by the radiator 317 and/or the second housing 311. In various embodiments, at least one vent 321 may be located near the end of the second housing 311 that securely attaches to the first housing 313. At least one corresponding vent 322 may be located at the end of the second housing 311 near where the reflector 317 attaches to the second housing. The red arrows in FIG. 7B illustrate how fluid (e.g., air, water, and/or the like) may enter vent 321, travel through the LED flood lamp 300 between the internal surface of the second housing 311 and the external surface of the reflector 317, and flow out through vent 322. In various embodiments, a plurality of a first set of vents 321 and a plurality of a second set of vents 322 may be provided. For example, the first and second sets of vents 321, 322 may each include four to ten vents. In some embodiments, the surface area of the first set of vents 321 may be approximately equal to or slightly smaller than the surface area of the second set of vents 322 in order to prevent fluid from backing up within the LED flood lamp 300.

In various embodiments, the vents 321, 322 may be elliptical, circular, polygonal, or irregular in shape. In one embodiment, in which the vents are elliptically shaped or have another shape with a defined major axis, the first set of vents 321 may be configured such that the major axis of the vent is approximately parallel to the longitudinal axis of the second housing 311. The second set of vents 322 may be configured such that the major axis of the vent is approximately perpendicular to the longitudinal axis of the second housing 311. Such a configuration may increase the heat radiated by the reflector 317 into the fluid passing through the LED flood lamp 300 and/or provide improved draining of the fluid through the second set of vents 322.

The base cap 318, first housing 313, reflector 317, and lens 312 may be configured to provide a sealed chamber 319 within the LED flood lamp 300. Thus, the electrical components of the LED flood lamp 300 (e.g., driver circuitry 16, the at least one LED 315, and/or the like) may not come into contact with the fluid (e.g., air, water, and/or the like) flowing through the vents 321, 322.

FIGS. 8A, 8B, 8C and 9 illustrate a fifth exemplary and non-limiting example of an embodiment of an LED flood lamp 400. The LED flood lamp 400 according to various embodiments thereof comprises a base cap 418, a first housing 413, a second housing 411, a reflector 417, a lens 412, and at least one LED 415 secured within the LED flood lamp 400 by a mounting frame 414. The base cap 418 may be configured to screw onto or snap onto the first housing 413. The second housing 411 may be configured to receive a substantial portion of the first housing 413 therein. For example, a portion of the first housing 413 may slide into the second housing 411. The first housing 413 may be secured within the second housing 411 via set screws, adhesive, and/or the like. The second housing 411 may be configured to act as a heat sink and/or a heat radiator. For example, the interior of the second housing 411 may comprise fins 423 configured to assist in the absorption and/or radiation of heat generated by the electrical elements of the LED flood lamp 400 (e.g., the driver circuitry 16 and the at least one LED 415). In this embodiment, the reflector 417 may comprise an aluminum or plastic radiator. The opening at the base (e.g., narrower end) of the reflector 417 may be configured to sit on top of the mounting frame 414. The reflector 417 may be configured to fit inside the second housing 411. For example, as shown in FIGS. 8A, 8B, and 8C, the reflector 417 is not visible form a side view of the LED flood lamp 400. Thus, the majority of the light emitted by the at least one LED 415 (e.g., greater than 80%) may be out through the reflector 417 toward the lens 412. In various embodiments, the lens 412 may be a prismatic diffuser cover made of optic glass and/or the like.

FIGS. 10A, 10B, 10C, and 11 illustrate an sixth exemplary and non-limiting example of an embodiment of an LED flood lamp 500. According to various embodiments, the LED flood lamp 500 includes a base cap 518, a first housing 513, a second housing 511, at least one LED 515, a mounting frame 514, a reflector 517, and a lens 512. The end cap 518 may be configured to screw onto, snap onto, and/or otherwise be affixed to one end of the first housing 513. The first housing 513 may be made of plastic, configured to house the driver circuitry 16, and may include a seat 530. The seat 530 may be configured such that when the second housing 511 is slid onto the first housing 513, the seat prevents the second housing from sliding too far down the first housing. The second housing 511 may be made of aluminum (e.g., die cast aluminum) or other appropriate material and configured to act as a heat sink for the electrical components of the LED flood lamp 500 (e.g., the driver circuitry 16 and/or the at least one LED 515). The interior of the second housing 511 may include one or more fins 523 configured to aid in the absorption and/or radiation of the heat generated by the electrical components of the LED flood lamp 500. The interior of the second housing 511 may also be configured to receive at least one LED 515. The at least one LED 515 may be configured as a chip-on-board (COB) assembly. The mounting frame 514 may be configured to rest upon the COB assembly such that the light emitted by the at least one LED 515 is emitted through a hole in the mounting frame. The COB assembly may be sandwiched between a portion of the second housing 511 and the mounting frame 514. In various embodiments, the mounting frame 514 may be made of a polymer material or plastic as is commonly known in the art. The reflector 517 may be configured as a partially conical shape with a lip on either end of the partial cone. The lip at the narrow end may be configured to rest or be secured to the mounting frame 514 or second housing 511. The lip at the wider end may be configured to flare outward, so as to not block any of the light emitted by the at least one LED 515 and may be configured to rest on top of the one or more fins 523. The lens 512 may be prismatic cover made of hard glass or a polymer material or plastic.

FIGS. 12A, 12B, 12C, and 13 illustrate a seventh exemplary and non-limiting example embodiment of an LED flood lamp 600. The LED flood lamp 600 may include a base cap 618, a first housing 613, a second housing 611, at least one LED 615, a mounting frame 614 for the securing the at least one LED within the LED flood lamp, a reflector 617, and a lens 612. The base cap 618 may be configured to be secured to a first end of the first housing 613 and electrically and/or mechanically connect the LED flood lamp 600 to a light fixture socket and/or the like. The first housing 613 may be configured to attach to the base cap 618, housing the driver circuitry 16, and attach to the second housing 611. The first housing 613 may include seat 630. The second housing 611 may be configured to slide onto the first housing 613. The seat 630 may prevent the second housing 611 from sliding too far onto the first housing 613. In other embodiments, the seat 630 may provide an aesthetic transition between the first and second housings. In various embodiments, the seat 630 may include one or more vents 621. The vents 621 may allow air to flow in and out of the one or more hollow fins 623 on the interior of the second housing 611. Thus, the vents 621 may allow air to circulate around the outside of the one or more fins 623 providing a fluid for carrying away heat from the LED flood lamp 600. Thus, the one or more fins 623 may absorb (e.g., along the surface of the fins on the inside of the second housing 611) heat generated by one or more of the electrical components of the LED flood lamp 600 (e.g., the driver circuitry 16 and at least one LED 615). The one or more fins 623 may then radiate the absorbed heat (e.g., along the surface of the fins accessible to the fluid (e.g., air)).

FIG. 14 provides a cross-sectional view of part of the first housing 613 and the second housing 611. The as shown, the interior surface of the second housing 611 includes one or more hollow fins 623. The at least one vent 621 located in the seat 630 of the first housing 613 allows fluid (e.g., air) to move in and out of the hollow region between the outer surface of the second housing 611 that is configured to provide an aesthetic appearance similar to a traditional halogen flood lamp and the outer surface of the one or more fins 623. The LED flood lamp 600 may therefore be efficiently cooled and have the appearance of a traditional halogen flood lamp.

As shown in FIG. 13, the LED flood lamp 600 includes at least one LED 615. The at least one LED 615 may be provided as a COB assembly and may be in electrical communication with the driver circuitry 616. Similar to driver circuitry 16, the driver circuitry 616 may include on or more circuit elements configured to condition and/or control the flow of electricity to the at least one LED 615. A mounting frame 614 is configured to sandwich the COB assembly including the at least one LED 615 against a portion of the second housing 611 and allow the light emitted by the at least one LED to pass through the mounting frame 614. A reflector 617 may be configured to condition at least some of the light emitted by the at least one LED 615 into a beam of light emitted through the lens 612. The lens 612 may be a light diffuser made of plastic, hard glass, optic glass, and/or the like and may be configured to condition, focus, and/or the like the beam of light emitted by the LED flood lamp 600. In various embodiments, the lens 612, second housing 611, first housing 613, and/or base cap 618, may be configured to enclose the at least one LED 615 such that the at least one LED is protected from moisture, dust, and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An assembly comprising:

a first housing;

a second housing having one or more lighting elements positioned therein; and a hollow region being defined radially between the first housing and the second housing, wherein the first housing comprises one or more vents located at a position other than a proximal and a distal end thereof.

2. The assembly according to claim 1, further comprising driver circuitry located inside the first housing and not open to the outside.

3. The assembly according to claim 2, wherein a portion of the second housing other than a seat portion of the second housing comprises one or more fins.

4. The assembly according to claim 1, wherein:

an inner reflector having a size less than a size of the second housing is positioned within a portion of the second housing other than a seat portion of the second housing; and an unvented chamber defined between the second housing and the inner reflector is not open to the outside.

5. The assembly according to claim 1, wherein the second housing is configured to facilitate heat transfer to the outside.

6. The assembly according to claim 1, wherein the one or more lighting elements are one or more LEDs.

7. The assembly according to claim 6, wherein:

an inner reflector having a size less than a size of the second housing is positioned within a portion of the second housing other than a seat portion of the second housing;

the one or more LEDs are fluidly isolated from the one or more vents; and the inner reflector is in thermal communication with the one or more LEDs.

8. The assembly according to claim 1, wherein the hollow region is vented to an outside of the second housing only via the one or more vents.

9. The assembly according to claim 1, wherein a portion of the second housing comprises one or more fins, and wherein fluid flow into and out of the one or more vents circulates around the portion of the one or more fins.

10. An assembly comprising:

a first housing; and a second housing having one or more fins, wherein the one or more fins extend transverse from the second housing, wherein a portion of the one or more fins define, in part, a hollow region between the first housing and the second housing.

11. The assembly according to claim 10, further comprising driver circuitry located inside the first housing and not open to the hollow region.

12. The assembly according to claim 10, further comprising an inner reflector concentrically smaller than the second housing and positioned within the second housing.

13. The assembly according to claim 10, wherein the hollow region is vented to the outside of the assembly only via one or more vents located on the first housing.

14. The assembly according to claim 10, further comprising an inner reflector positioned within the second housing, wherein:

a chamber is defined between a portion of the inner reflector and the second housing; and the chamber is not vented to the outside of the assembly.

15. The assembly according to claim 13, wherein fluid flow into and out of the one or more vents circulates around the portion of the one or more fins.

16. The assembly according to claim 13, wherein the hollow region is configured to facilitate heat transfer to the outside.

17. The assembly according to claim 13, wherein one or more light emitting diodes (LEDs) are positioned within the second housing.

18. The assembly according to claim 17, wherein a reflector is in thermal communication with the one or more LEDs.

19. The assembly according to claim 17, wherein the one or more LEDs are not in fluid communication with the one or more vents.

20. The assembly according to claim 10, wherein:

the first housing is positioned radially outward from the second housing, and the one or more fins extend inward from the second housing.

* * * * *